US012742550B2

(12) United States Patent
Nath et al.

(10) Patent No.: US 12,742,550 B2
(45) Date of Patent: Sep. 22, 2026

(54) TURBINE ENGINE INCLUDING A COMBUSTOR

(71) Applicant: General Electric Company, Schenectady, NY (US)

(72) Inventors: Hiranya Nath, Bengaluru (IN); Clayton S. Cooper, Loveland, OH (US); Richard W. Stickles, Loveland, OH (US); Michael A. Benjamin, Cincinnati, OH (US); Dharmaraj Pachaiappan, Bengaluru (IN); Ranganatha Narasimha Chiranthan, Bengaluru (IN); Sripathi Mohan, Bengaluru (IN)

(73) Assignee: GENERAL ELECTRIC COMPANY, Evendale, OH (US)

(*) Notice: Subject to any disclaimer, the term of this patent is extended or adjusted under 35 U.S.C. 154(b) by 27 days.

(21) Appl. No.: 18/326,639

(22) Filed: May 31, 2023

(65) Prior Publication Data

US 2024/0401811 A1 Dec. 5, 2024

(51) Int. Cl.

*F23R 3/28* (2006.01)
*F02C 9/44* (2006.01)
*F23R 3/34* (2006.01)

(52) U.S. Cl.

CPC ................ *F23R 3/286* (2013.01); *F02C 9/44* (2013.01); *F23R 3/343* (2013.01); *F23R 3/346* (2013.01)

(58) Field of Classification Search

CPC .. F23R 3/343; F23R 3/346; F23R 3/34; F23R 3/06; F23R 3/60; F23R 3/286; F02C 9/44

See application file for complete search history.

(56) References Cited

U.S. PATENT DOCUMENTS

| | | | | |
|---|---|---|---|---|
| 4,928,481 | A | 5/1990 | Joshi et al. | |
| 6,691,515 | B2 | 2/2004 | Verdouw et al. | |
| 6,962,055 | B2 | 11/2005 | Chen et al. | |
| 6,996,991 | B2 * | 2/2006 | Gadde | F23R 3/286 60/737 |
| 7,886,539 | B2 | 2/2011 | Cai | |
| 8,707,707 | B2 | 4/2014 | Venkataraman et al. | |
| 9,068,748 | B2 | 6/2015 | Hoke | |
| 9,285,123 | B2 | 3/2016 | Garay et al. | |
| 9,797,601 | B2 | 10/2017 | Cheung et al. | |
| 9,958,162 | B2 | 5/2018 | Dai et al. | |
| 10,060,629 | B2 * | 8/2018 | Kim | F23R 3/34 |

(Continued)

*Primary Examiner* — Gerald L Sung

*Assistant Examiner* — Jingchen Liu

(74) *Attorney, Agent, or Firm* — Venable LLP; Peter T. Hrubiec; Michele V. Frank

(57) ABSTRACT

A combustor for a turbine engine includes a combustion chamber including an outer liner and an inner liner, and an annular dome. A plurality of first mixing assemblies includes a pilot mixer and a first main mixer, the first mixing assemblies disposed through the annular dome. The pilot mixer injects a pilot mixer fuel-air mixture axially into a first combustion zone, and the first main mixer injects a first main mixer fuel-air mixture radially into the first combustion zone. A plurality of second mixing assemblies includes a second main mixer, the second mixing assemblies being axially aft of the plurality of first mixing assemblies. The second main mixer injects a second main mixer fuel-air mixture radially into a second combustion zone that is axially aft of, and separate from, the first combustion zone.

20 Claims, 15 Drawing Sheets

(56) References Cited

U.S. PATENT DOCUMENTS

| | | | | |
|---|---|---|---|---|
| 10,222,066 | B2 | 3/2019 | Chen et al. | |
| 10,330,320 | B2 | 6/2019 | Snyder, III | |
| 10,330,321 | B2 | 6/2019 | Snyder | |
| 10,690,350 | B2 | 6/2020 | Berry | |
| 10,976,053 | B2 | 4/2021 | Boardman et al. | |
| 11,073,286 | B2 | 7/2021 | Boardman et al. | |
| 11,137,144 | B2 | 10/2021 | Wilson et al. | |
| 11,143,407 | B2 | 10/2021 | Hoke et al. | |
| 11,313,561 | B2 | 4/2022 | Roh | |
| 2007/0028595 | A1* | 2/2007 | Mongia | F23R 3/286 60/226.1 |
| 2008/0236165 | A1* | 10/2008 | Baudoin | F23R 3/343 60/746 |
| 2010/0011771 | A1* | 1/2010 | Evulet | F23R 3/286 60/776 |
| 2010/0050644 | A1* | 3/2010 | Pidcock | F23R 3/343 60/737 |
| 2015/0219338 | A1* | 8/2015 | Dai | F23R 3/50 60/746 |
| 2016/0116169 | A1 | 4/2016 | Hyland et al. | |
| 2016/0123596 | A1 | 5/2016 | Hoke et al. | |
| 2016/0258627 | A1 | 9/2016 | Cheung et al. | |
| 2016/0258629 | A1* | 9/2016 | Slobodyanskiy | F23N 5/003 |
| 2016/0320063 | A1 | 11/2016 | Dai et al. | |
| 2017/0003032 | A1* | 1/2017 | Jorgensen | F23R 3/14 |
| 2017/0248313 | A1* | 8/2017 | Hannwacker | F23R 3/007 |
| 2017/0299183 | A1* | 10/2017 | Bagchi | F23R 3/16 |
| 2017/0363004 | A1 | 12/2017 | Ku | |
| 2018/0094590 | A1* | 4/2018 | Proscia | F23R 3/12 |
| 2018/0094814 | A1 | 4/2018 | Proscia | |
| 2018/0094817 | A1 | 4/2018 | Proscia | |
| 2018/0156463 | A1 | 6/2018 | Dai et al. | |
| 2018/0156464 | A1 | 6/2018 | Dai et al. | |
| 2018/0163629 | A1* | 6/2018 | Proscia | F23R 3/346 |
| 2019/0162414 | A1 | 5/2019 | Ogata et al. | |

* cited by examiner 1000
1002
1004
1006
1012
1020a
1020b
C 900
902
904
906
912
920a
920b
C 800
802
804
806
812
820a
820b
C

TURBINE ENGINE INCLUDING A COMBUSTOR

TECHNICAL FIELD

The present disclosure relates generally to turbine engines including combustors.

BACKGROUND

A turbine engine generally includes a fan and a core section arranged in flow communication with one another. A combustor is arranged in the core section to generate combustion gases for driving a turbine of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 12 is a schematic cross-sectional view of a combustor for a turbine engine, taken along a longitudinal centerline axis of the turbine engine, according to another embodiment.

DETAILED DESCRIPTION

Figure 1:
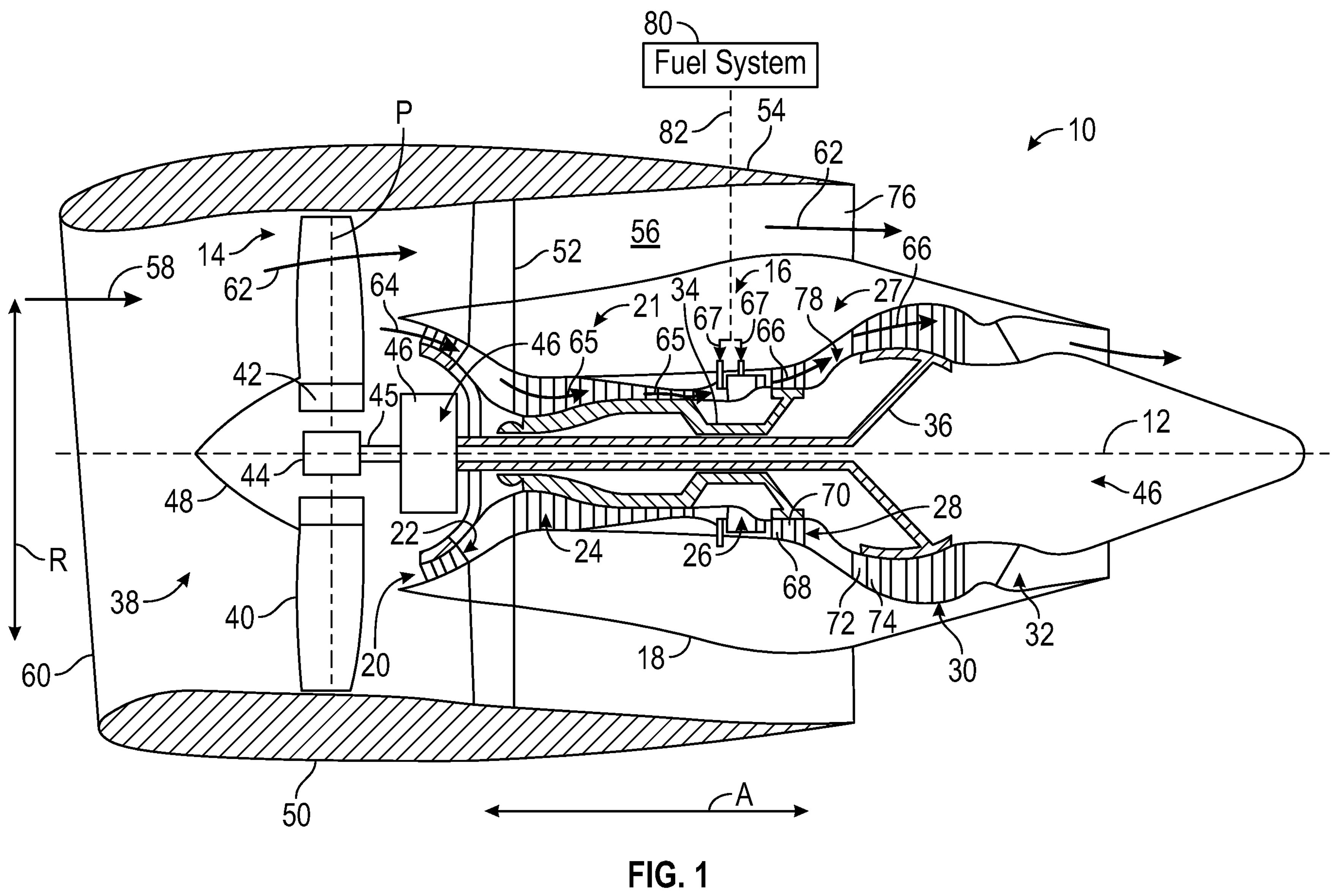
FIG. 1 is a schematic cross-sectional diagram of a turbine engine, taken along a centerline axis of the turbine engine, according to the present disclosure.

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The various power levels of the turbine engine detailed herein are defined as a percentage of a sea level static (SLS)

maximum engine rated thrust. Low power operation includes, for example, less than thirty percent (30%) of the SLS maximum engine rated thrust of the turbine engine. Mid-level power operation includes, for example, thirty percent (30%) to eighty-five (85%) of the SLS maximum engine rated thrust of the turbine engine. High power operation includes, for example, greater than eighty-five percent (85%) of the SLS maximum engine rated thrust of the turbine engine. The values of the thrust for each of the low power operation, the mid-level power operation, and the high power operation of the turbine engine are exemplary only, and other values of the thrust can be used to define the low power operation, the mid-level power operation, and the high power operation.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Combustors for turbine engines, such as turbine engines for aircraft, ignite fuel and air mixtures to produce combustion gases, which in turn drive one or more turbines of the turbine engine, thereby rotating one or more loads (e.g., a fan, a propeller, etc.). Air pollution concerns have led to stricter combustion emissions standards. Such standards regulate the emission of nitrogen oxide ($NO_x$), non-volatile particulate matter (nvPM), as well as other types of exhaust emissions, from the turbine engine. The nvPM includes, for example, soot, smoke, or the like. Generally, $NO_x$ is formed during the combustion process due to high flame temperatures in the combustor. Turbine engine design tradeoffs are necessary to meet requirements for noise, emissions, fuel burn, cost, weight, and performance. As temperatures in the combustor increase, $NO_x$ generation increases due to the higher temperatures. In turbine engine design, balancing a reduction in $NO_x$ emissions, nvPM emissions, $CO_2$, and noise, while achieving improved engine performance, is difficult. For example, combustor design changes to achieve lower emissions must not impact the ability of the combustion system to satisfy performance and certification requirements throughout the operating cycle of the aircraft. Further, high bypass ratio turbine engines (e.g., bypass ratios greater than 9.0) require high fuel-air ratios and need multiple fuel-staging to meet $NO_x$ requirements.

Variations of two combustor architectures are used in turbine engine design to balance operational and environmental requirements: a rich-quench lean (RQL) combustor and a lean burn combustor. The RQL combustor operates as a fuel-rich (e.g., excess fuel) mixture in a front-end primary zone that is directly downstream of the fuel injector and the swirler and provides flame stability over the range of combustor operation. As the fuel-rich mixture moves axially in the combustor, air jets are used to help close the primary zone recirculation zone and to provide additional air to continue reactions and also to quench the combustion gas to a lean mixture to reduce $NO_x$ emissions and to reduce the highest temperature before the mixture exits the combustor. For example, the additional air from the air jets increases the amount of air in the fuel-air mixture changing the mixture from fuel-rich to fuel-lean. RQL combustors produce great amounts of soot in the fuel-rich primary zone, but $NO_x$ is reduced due to temperatures being low for fuel-rich mixtures. A rapid RQL quench zone design is needed in RQL combustors to balance a reduction of combustor hot spots and time at a temperature at which $NO_x$ is formed, while providing adequate temperature and time to burn out the soot and the nvPM formed in the primary zone.

Lean burn combustors avoid the high $NO_x$ formation zone resulting from high temperatures by starting lean and remaining lean at higher power outputs of the turbine engine. A small, fuel-rich flame, referred to as a pilot flame, is used that operates with a lower percentage of the total fuel and stabilizes the flame when in a lean burning mode. The pilot provides all of the fuel during low-power operation and part-power operation to maintain improved combustion efficiencies, and a main fuel circuit is opened to produce a main flame for higher power operation or mid-level power operation. Thus, the flame during the mid-level power operation and/or during the higher power operation includes the pilot flame and the main flame. A lean burn design provides all of the mixing in the front-end (e.g., the upstream end) of the combustor, which helps to reduce nvPM emissions by remaining fuel-lean and avoiding large combustor volumes of fuel-rich, high nvPM-producing zones in the combustor. When operating on pilot only flow at lower powers, the lean burn combustor produces non-zero nvPM as the pilot flame is quenched by the main air flow, similar to the RQL combustor.

As detailed above, there are tradeoffs in balancing $NO_x$ emissions, nvPM emissions, and carbon monoxide (CO) and unburned hydrocarbon (UHC) emissions in the combustion chamber. $NO_x$ is produced at high engine power levels, and the $NO_x$ is produced in the post-flame region of the combustion chamber, is temperature driven, and is time at temperature driven. For example, a greater amount of $NO_x$ is produced at higher temperatures and longer times at temperature. Current turbine engines control $NO_x$ emissions by reducing peak combustor temperatures and combustor residence time at those high temperatures. Reducing combustor residence time and combustor volume and length have the added benefit of reduced engine weight. For short combustor residence times and low combustion temperatures where $NO_x$ formation is low, however, CO and UHC emissions are higher due to incomplete combustion, and the combustor liner cooling air during low power ground operations can quench reactions of CO and UHC. Fuel-rich zones in the combustor form nvPM emissions, and increased time (combustor volume) is needed to oxidize the nvPM before being quenched in the downstream cooler region of the engine after exiting the combustor. Therefore, to balance all emissions requirements, turbine engine designs need an improved fuel and air placement in the dome region, an improved stoichiometry in the combustor, and improved residence time. Some turbine engines utilize leaner mixtures or changes in fuel spray at the upstream end of the combustor to reduce nvPM emissions. Such turbine engines, however, reduce operability and increase $NO_x$ emissions and require high fuel-air ratios for advanced thermodynamic cycles. Further, higher fuel-to-air ratios (e.g., greater than 0.031) at take-off are needed in such advanced engine thermodynamic cycles. Current combustor designs that utilize axial staging, traditional trapped vortex cavities, or the like, that utilize lower fuel-to-air ratios (e.g., less than or equal to 0.031) at take-off do not adequately optimize the stoichiometry of the combustor to meet required $NO_x$ emission targets when the fuel-to-air ratio is increased to the aforementioned higher values.

Embodiments of the present disclosure provide systems and methods to balance the requirements in turbine engines of low fuel burn and carbon dioxide ($CO_2$) emissions that are achieved with combustor fuel-air ratios, and other pollutant emissions, such as $NO_x$ emissions, that increase with temperature increases. Such a reduction in the various types of emissions is difficult to achieve when fuel burn and emissions need to be reduced over an entirety of a mission cycle of the turbine engine of an aircraft. The mission cycle includes low power operation, mid-level power operation, and high power operation. Low power operation includes, for example, engine start, idle, taxiing, and approach. Mid-level power operation includes, for example, cruise. High power operation includes, for example, takeoff and climb.

Embodiments of the present disclosure utilize a lean burn staged combustion system. Thus, the present disclosure provides a hybrid staged combustor for low $NO_x$ emissions (e.g., at least 50% below the regulations in the eleventh meeting of the Committee on Aviation Environmental Protection (CAEP/11) of the International Civil Aviation Organization (ICAO). For example, the hybrid staged combustor includes both radial staging and axial staging of the fuel. The hybrid staged combustor includes a nested flame structure produced by a first mixing assembly that includes a pilot mixer and a first main mixer encircling the pilot mixer for radial fuel staging and air staging. For example, the pilot mixer injects the fuel and the air axially from the pilot mixer and into the combustion chamber, and the first main mixer, located radially outward of the pilot mixer, injects the fuel and the air radially from the first main mixer and into the combustion chamber. The first mixing assembly is located at the annular dome that is positioned at a forward end (e.g., an upstream end) of the combustion chamber. The hybrid staged combustor also includes an auxiliary flame produced by a second mixing assembly that includes a second main mixer located axially aft, or axially downstream, of the first mixing assembly. The second main mixer can be located on the outer liner and/or the inner liner of the combustion chamber, and injects the fuel and the air radially into the combustion chamber. The first mixing assembly injects the fuel and the air into a first combustion zone, and the second mixing assembly injects the fuel and the air into a second combustion zone that is located axially aft, or axially downstream, of the first combustion zone. The nested flame provides lean combustion, and the auxiliary flame located downstream of the nested flame provides added flexibility of having even leaner combustion to reduce $NO_x$ emissions further than combustors without the benefit of the present disclosure (e.g., combustors with axial staging only). In this way, the radial staging and the axial staging combined provide for improved stoichiometric capabilities in the combustor, while reducing $NO_x$ emissions, across the entire mission operating cycle of a turbine engine.

In some embodiments, the outer liner and/or the inner liner can include combustion holes and/or dilution holes provided upstream and/or downstream of the second main mixer. The second main mixer can have co-rotating or counter-rotating swirling air with respect to the swirling air from the first main mixer. At low power engine operation, only the pilot mixer is used to produce a pilot flame. In some embodiments, both the pilot mixer and the first main mixer can be used during low power engine operation and the fuel and the air can be radially staged among the pilot mixer and the first main mixer for flame stability and/or to avoid lean blowout (LBO). At mid-power engine operation or high power engine operation, the pilot mixer, the first main mixer, and the second main mixer are operational at all operating conditions and the fuel splits and air splits are controlled to achieve combustion efficiency, to reduce emissions, and to provide improved operability of the combustor, as compared to combustors without the benefit of the present disclosure. The outer liner and the inner liner can be any shape, with split liner designs. The fuel can be any type of fuel used for turbine engines, such as, for example, JetA, sustainable aviation fuels (SAF) including biofuels, hydrogen-based fuel ($H_2$), or the like.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or the fan section 14. As the volume of air 58 passes across the fan blades 40, a first portion of air 62 is directed or routed into the bypass airflow passage 56, and a second portion of air 64 is directed or is routed into the upstream section of the core air flow path, or, more specifically, into the annular inlet 20 of the LP compressor 22. The ratio between the first portion of air 62 and the second portion of air 64 is commonly known as a bypass ratio. The pressure of the second portion of air 64 is then increased, forming compressed air 65, and the compressed air 65 is routed through the HP compressor 24 and into the combustion section 26, where the compressed air 65 is mixed with fuel and burned to provide combustion gases 66.

The combustion gases 66 are routed into the HP turbine 28 and expanded through the HP turbine 28 where a portion of thermal energy and/or kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of the thermal energy and/or kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

As detailed above, the second portion of air 64 is mixed with fuel 67 in the combustion section 26 to produce the combustion gases 66. The turbine engine 10 also includes a fuel system 80 for providing the fuel 67 to the combustion section 26. The fuel system 80 includes a fuel tank (not shown) for storing fuel therein and one or more fuel injector lines 82 to provide the fuel 67 to the combustion section 26, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, and/or turboshaft engines.

Figure 2:
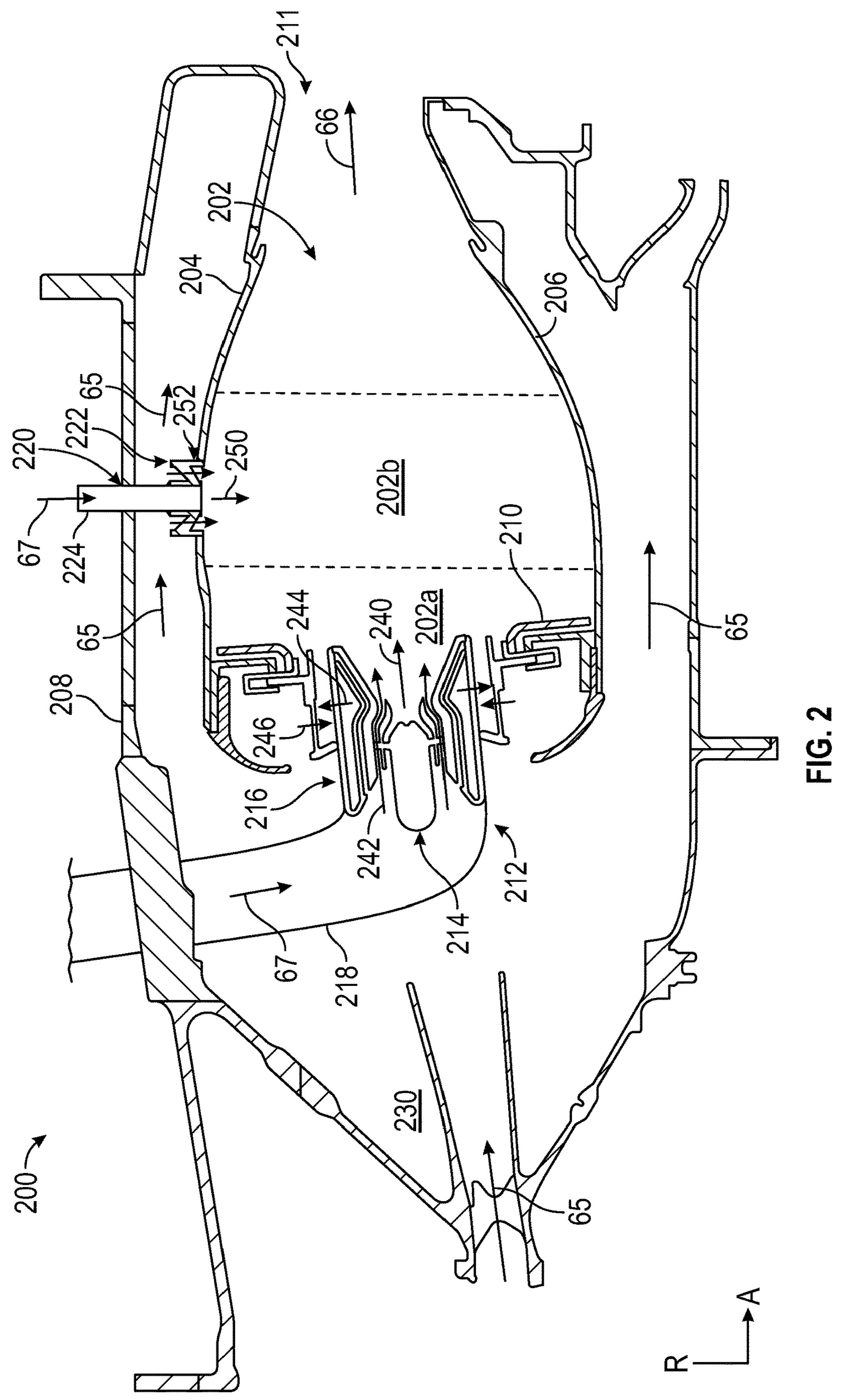
FIG. 2 is a schematic cross-sectional diagram of a combustor for a turbine engine, taken along a longitudinal centerline axis of the turbine engine, according to the present disclosure.

FIG. 2 is a schematic cross-sectional diagram of a combustor 200 that can be used with the turbine engine 10 (FIG. 1), taken along a longitudinal centerline axis 12 (FIG. 1) of the turbine engine 10 (FIG. 1). In the exemplary embodiment, the combustion section 26 (FIG. 1) includes the combustor 200 having a combustion chamber 202 defined by an outer liner 204 and an inner liner 206. The outer liner 204 and the inner liner 206 are annular about the longitudinal centerline axis 12 of the turbine engine 10 (FIG. 1). The outer liner 204 defines a radially outer boundary of the combustion chamber 202, and the inner liner 206 defines a radially inner boundary of the combustion chamber 202. The outer liner 204 and the inner liner 206 are spaced radially inward from an annular combustor casing 208 that extends circumferentially about the outer liner 204 and the inner liner 206. The combustor 200 also includes an annular dome 210 mounted upstream from the outer liner 204 and the inner liner 206. The annular dome 210 defines an upstream end of the combustion chamber 202. The combustion chamber 202 extends from the annular dome 210 to a combustion chamber outlet 211.

A plurality of first mixing assemblies 212 (only one is illustrated in FIG. 2) are spaced circumferentially about the annular dome 210 to deliver a first mixture of fuel and air to the combustion chamber 202. For example, the plurality of first mixing assemblies 212 delivers the first mixture of fuel and air into a first combustion zone 202*a* of the combustion chamber 202, as detailed further below. In FIG. 2, each first mixing assembly 212 is a twin annular premixing swirler (TAPS) that includes a pilot mixer 214 and a first main mixer 216. The first main mixer 216 is concentrically aligned with respect to the pilot mixer 214 and extends circumferentially about the pilot mixer 214. A plurality of first fuel injectors 218 (only one is illustrated in FIG. 2) are coupled in flow communication with each respective first mixing assembly 212. The plurality of first fuel injectors 218 are spaced circumferentially about the annular dome 210 and extend axially from the annular combustor casing 208 to the plurality of first mixing assemblies 212.

A plurality of second mixing assemblies 220 (only one illustrated in FIG. 2) are spaced circumferentially about the outer liner 204 to deliver a second mixture of fuel and air to the combustion chamber 202. For example, the plurality of second mixing assemblies 220 delivers the second mixture of fuel and air into a second combustion zone 202*b* of the combustion chamber 202, as detailed further below. Each of the plurality of second mixing assemblies 220 includes a second main mixer 222. A plurality of second fuel injectors 224 (only one is illustrated in FIG. 2) are coupled in flow communication with each respective second main mixer 222. The plurality of second fuel injectors 224 are spaced circumferentially about the outer liner 204 and extend axially from the annular combustor casing 208 to the plurality of second mixing assemblies 220.

In operation, the combustor 200 receives compressed air 65 discharged from the HP compressor 24 (FIG. 1) in a diffuser section 230 at a location upstream of the combustion chamber 202. A portion of the compressed air 65 is channeled through the first mixing assembly 212. At the first mixing assembly 212, the compressed air 65 is mixed with the fuel 67 from the first fuel injector 218 and discharged into the combustion chamber 202. For example, the pilot mixer 214 mixes the compressed air 65 and the fuel 67 to generate a first mixture of compressed air 65 and fuel 67. The first mixture of compressed air 65 and fuel 67 is ignited by an igniter (not shown in FIG. 2 for clarity) creating a first flame within the combustion chamber 202 that burns the first mixture of compressed air 65 and fuel 67 and provides combustion gases 66 that are channeled downstream to a first stage turbine nozzle of the HP turbine 28 (FIG. 1). The first flame is also referred to as a pilot flame. A portion of the compressed air 65 is also channeled through the first main mixer 216 and the first main mixer 216 mixes the compressed air 65 and the fuel 67 to generate a second mixture of compressed air 65 and fuel 67. The second mixture of compressed air 65 and fuel 67 is ignited by the igniter creating a second flame within the combustion chamber 202 that burns the second mixture of compressed air 65 and fuel 67 and provides combustion gases 66 that are channeled downstream to the first stage turbine nozzle of the HP turbine 28. The second flame is referred to as a first main flame. The first flame and the second flame together are referred to as a nested flame. For example, a nested flame is when there is the pilot flame at the center core of each fuel nozzle and the first main flame surrounds the pilot flame in the annular space about each fuel nozzle. In this way, the pilot flame is "nested" inside the first main flame. The nested flame (e.g., the first flame and the second flame) burns within the first combustion zone 202*a*.

A portion of the compressed air 65 is also channeled through the second mixing assembly 220. At the second mixing assembly 220, the compressed air 65 is mixed with the fuel 67 from the second fuel injector 224 and discharged into the combustion chamber 202. For example, the second main mixer 222 mixes the compressed air 65 and the fuel 67 to generate a third mixture of compressed air 65 and fuel 67. The third mixture of compressed air 65 and fuel 67 is ignited by the igniter creating a third flame within the combustion chamber 202 that burns the second mixture and provides combustion gases 66 that that are channeled downstream to the first stage turbine nozzle of the HP turbine 28 (FIG. 1). For example, the third flame burns within the second combustion zone 202*b*. The third flame is referred to as a second main flame or an auxiliary flame.

The combustor 200 is a hybrid staged combustor. In particular, the plurality of first mixing assemblies 212 provides for radial fuel staging at the annular dome 210 in the first combustion zone 202*a*, and the plurality of second mixing assemblies 220 provides for axial fuel staging in the second combustion zone 202*b*. For example, the plurality of second mixing assemblies 220 and the second combustion zone 202*b* are located axially downstream of the plurality of first mixing assemblies 212 and the first combustion zone 202*a*, respectively. Such a configuration of the combustor 200 provides for lean combustion provided by the plurality of first mixing assemblies 212 (e.g., by radially staging the pilot mixer 214 and the first main mixer 216), and even leaner combustion provided by the plurality of second mixing assemblies 220 to reduce $NO_x$ emissions as compared to combustors without the benefit of the present disclosure, as detailed further below.

The combustor 200 is a lean burn combustor. Specifically, at engine start conditions and at an engine low power operation (e.g., less than 30% of SLS maximum engine rated thrust) of the turbine engine 10 (FIG. 1), such as at idle, at taxi, or at approach, the combustor 200 uses only the fuel 67 provided to the pilot mixer 214 for generating the combustion gases 66. At the pilot mixer 214, the fuel 67 includes a pilot fuel stream 240 that is mixed with a first portion 242 of the compressed air 65 to provide a rich fuel-air mixture (e.g., higher fuel-to-air ratios within the mixture) that is ignited for a pilot flame within the first combustion zone 202*a* that is adjacent to the pilot mixer 214.

In some embodiments, the combustor 200 can split the fuel 67 among the pilot mixer 214, and the first main mixer 216 and/or the second main mixer 222 during the engine low power operation. For example, at the first main mixer 216, the fuel 67 includes a first main fuel stream 244 that is mixed with a second portion 246 of the compressed air 65 to provide a first main fuel-air mixture that is fuel-lean (e.g., lower fuel-to-air ratios within the mixture) that is ignited for a first main flame within the first combustion zone 202*a* of the combustion chamber 202 that is adjacent to the first main mixer 216, thus, providing a lean burn combustion process to generate combustion gases 66 while reducing $NO_x$ emissions by operating fuel-lean, as detailed further below. Further, the lean burn combustion process provides for low non-volatile particulate matter (nvPM), such as soot or smoke, and reduces $NO_x$ emissions. The pilot mixer 214 injects the pilot fuel stream 240 generally axially from the first mixing assembly 212. The first main mixer 216 injects the first main fuel stream 244 radially outward from the first mixing assembly 212. In this way, the first mixing assembly 212 radially stages the fuel injection using the pilot mixer 214 (e.g., axial fuel injection) and the first main mixer 216 (e.g., radial fuel injection). The first main mixer 216 swirls the second portion 246 of the compressed air 65 in a first swirl direction. The fuel-air mixture from the pilot mixer 214 is referred to as a pilot mixer fuel-air mixture, and the fuel-air mixture from the first main mixer 216 is referred to as a first main mixer fuel-air mixture.

At the second main mixer 222, the fuel 67 includes a second main fuel stream 250 that is mixed with a third portion 252 of the compressed air 65 to provide a second main fuel-air mixture that is fuel-lean (e.g., lower fuel-to-air ratios within the mixture) that is ignited for a second main flame within the second combustion zone 202*b* of the combustion chamber 202 that is adjacent the second main mixer 222, thus, providing a lean burn combustion process to generate combustion gases 66 while further reducing $NO_x$ emissions by operating fuel-lean. The second main fuel-air mixture is more fuel-lean than the first main fuel-air mixture. The second main mixer 222 injects the second main fuel stream 250 radially inward into the second combustion zone 202*b* of the combustion chamber 202 axially downstream of the first main fuel-air mixture. In this way, the combustor 200 provides for both radial staging (e.g., at the first mixing assembly 212) and axial staging (e.g., at the second mixing assembly 220) to provide for a greater reduction in $NO_x$ emissions compared to combustors without the benefit of the present disclosure. For example, the air splits and the fuel splits to the plurality of first mixing assemblies 212 and to the plurality of second mixing assemblies 220 can be controlled at different operating conditions of the combustor 200 to reduce the $NO_x$ emissions throughout the entire operating cycle of the combustor 200, as detailed further below. The second main mixer 222 swirls the third portion 252 of the compressed air 65 in a second swirl direction. The second swirl direction is the same direction as the first swirl direction such that the third portion 252 of compressed air 65 from the second main mixer 222 is co-rotating with the second portion 246 of compressed air 65 from the first main mixer 216. In some embodiments, the second swirl direction is opposite the first swirl direction such that the third portion 252 of compressed air 65 from the second main mixer 222 is counter-rotating from the second portion 246 of compressed air 65 from the first main mixer 216. The fuel-air mixture from the second main mixer 222 is referred to as a second main mixer fuel-air mixture.

At a high power operation (e.g., greater than 85% of SLS maximum engine rated thrust) of the turbine engine 10 (FIG. 1), such as at takeoff or at climb, and at mid-level power operation (e.g., 30% to 85% of SLS maximum engine rated thrust) of the turbine engine 10 (FIG. 1), such as at cruise, the combustor 200 uses a fuel 67 split among the pilot mixer 214, the first main mixer 216, and the second main mixer 222 for generating the combustion gases 66. In this way, the combustor 200 permits control of the combustion dynamics in a radially-staged and axially-staged combustion configuration. The fuel split among the pilot mixer 214, the first main mixer 216, and the second main mixer 222 can be optimized to mitigate dynamics while also meeting combustor performance metrics for the various operating cycles of the turbine engine 10 (FIG. 1). For example, the fuel split among the pilot mixer 214, the first main mixer 216, and the second main mixer 222 is controlled to reduce $NO_x$ emissions during the entire operating cycle (e.g., idle, taxi, takeoff, climb, cruise, and approach). Staging in such a way (e.g., radially-staged and axially-staged) allows for higher mixer air flows so that the combustor 200 operates fuel-lean for operability in both a forward portion and an aft portion of the combustor 200 at high power conditions while reducing $NO_x$ emissions as compared to combustors without the benefit of the present disclosure that utilize axial staging only.

During operation, the compressed air 65 is split among the annular dome 210, the pilot mixer 214, the first main mixer 216, the second main mixer 222, between the outer liner 204 and the annular combustor casing 208, and between the inner liner 206 and the annular combustor casing 208. The compressed air 65 splits are selected to provide a lean combustor in both the first combustion zone 202*a* and the second combustion zone 202*b*, as detailed further below. For example, the combustor 200, the annular dome 210, the plurality of first mixing assemblies 212, and the plurality of second mixing assemblies 220 are oriented and configured to provide 5% to 9% of the compressed air 65 to the annular dome 210, 7% to 20% of the compressed air 65 to the pilot mixer 214 (e.g., the first portion 242 of compressed air 65), 30% to 60% of the compressed air 65 to the first main mixer 216 (e.g., the second portion 246 of compressed air 65), 11% to 30% of the compressed air 65 to the second main mixer 222 (e.g., the third portion 252 of compressed air 65), 7% to 10% of the compressed air 65 to the outer liner 204 and the inner liner 206 in an area forward of the plurality of second mixing assemblies 220, and 6% to 9% of the compressed air 65 to the outer liner 204 and the inner liner 206 in an area aft of the plurality of second mixing assemblies 220.

The annular dome 210 can include one or more cooling holes to provide the compressed air 65 through the annular dome 210 into the combustion chamber 202 to cool a downstream side of the annular dome 210 (e.g., a side of the annular dome 210 that is exposed to the combustion chamber 202). The outer liner 204 can include one or more cooling holes located on the outer liner 204 forward and aft of the plurality of second mixing assemblies 220 to provide the compressed air 65 through the outer liner 204 into the combustion chamber 202 to cool an inner surface of the outer liner 204 (e.g., a surface of the outer liner 204 that is exposed to the combustion chamber 202). Similarly, the inner liner 206 can include one or more cooling holes located on the inner liner 206 forward and aft of the plurality of second mixing assemblies 220 to provide the compressed air 65 through the inner liner 206 into the combustion chamber 202 to cool an inner surface of the inner liner 206 (e.g., a surface of the inner liner 206 that is exposed to the combustion chamber 202).

The fuel 67 is split among the pilot mixer 214, the first main mixer 216, and the second main mixer 222 to provide lean combustion in the first combustion zone 202*a* and the second combustion zone 202*b* to reduce $NO_x$ emissions. For example, the pilot fuel stream 240 includes 90% to 100% of the fuel 67 during idle conditions of the turbine engine, 35% to 50% of the fuel during approach conditions of the turbine engine, 20% to 40% of the fuel during cruise conditions of the turbine engine, and 5% to 20% of the fuel during climb conditions or take-off conditions of the turbine engine. The first main fuel stream 244 includes 0% to 5% of the fuel during idle conditions of the turbine engine, 50% to 58% of the fuel during approach conditions of the turbine engine, 55% to 70% of the fuel during cruise conditions of the turbine engine, and 65% to 72% of the fuel during climb conditions or take-off conditions of the turbine engine. The second main fuel stream 250 includes 0% to 5% of the fuel during idle conditions of the turbine engine, 0% to 7% of the fuel during approach conditions of the turbine engine, 5% to 10% of the fuel during cruise conditions of the turbine engine, and 15% to 23% of the fuel during climb conditions or take-off conditions of the turbine engine. The fuel splits are selected to be fuel-rich for good operability at low power operation (e.g., idle, taxi, approach, etc.) and to be fuel-lean at mid-power operation (e.g., cruise) and high power operation (e.g., take-off or climb) for low $NO_x$ emissions.

The fuel-air mixture for each of the pilot mixer 214, the first main mixer 216, and the second main mixer 222 is defined by an equivalence ratio. The equivalence ratio is an actual fuel-air ratio (e.g., the fuel-air splits detailed above) to a stoichiometric fuel-air ratio. The actual fuel-air ratio is the fuel-air ratio provided to each of the pilot mixer 214, the first main mixer 216, and the second main mixer 222. The stoichiometric fuel-air ratio is an ideal fuel-air ratio that burns all fuel with no excess air. If the equivalence ratio is less than one, the combustion is considered lean with excess air, and if the equivalence ratio is greater than one, the combustion is considered rich with incomplete combustion.

In general, for the pilot mixer 214, the pilot mixer equivalence ratio decreases from idle, to approach, to cruise, to climb, and to take-off. For example, the pilot mixer 214 operates fuel-rich (e.g., the pilot mixer equivalence ratio is greater than one) for the operating cycle of the turbine engine 10 (FIG. 1) and, in some embodiments, can operate fuel-lean (e.g., the pilot mixer equivalence ratio is less than one) during high power operation. In general, for the first main mixer 216, the first main mixer equivalence ratio increases from idle, to approach, to cruise, to climb, to take-off. For example, the first main mixer 216 operates fuel lean (e.g., the first main mixer equivalence ratio is less than one) for the entire operating cycle of the turbine engine 10 (FIG. 1). In general, for the second main mixer 222, the second main mixer equivalence ratio increases from idle, to approach, to cruise, to climb, and to take-off. For example, the second main mixer 222 operates fuel-lean (e.g., the second main mixer equivalence ratio is less than one) for the entire operating cycle of the turbine engine 10 (FIG. 1). The second main mixer 222 operates more fuel-lean than the first main mixer 216 (e.g., the second main mixer equivalence ratio is less than the first main mixer equivalence ratio). In this way, the pilot mixer 214 is fuel-rich at low power operation for operability of the combustor 200, and the first main mixer 216 and the second main mixer 222 are fuel-lean during high power operation for low $NO_x$ emissions. Further, since the second main mixer 222 is positioned downstream within the combustor 200, the combustion process generated by the second main mixer 222 has a short residence time compared to the residence time of the first main mixer 216 (e.g., located at a forward end of the combustor 200). In this way, the second main mixer 222 operates fuel-lean so as to not inject a rich streak of fuel downstream within the combustion chamber 202.

Figure 3:
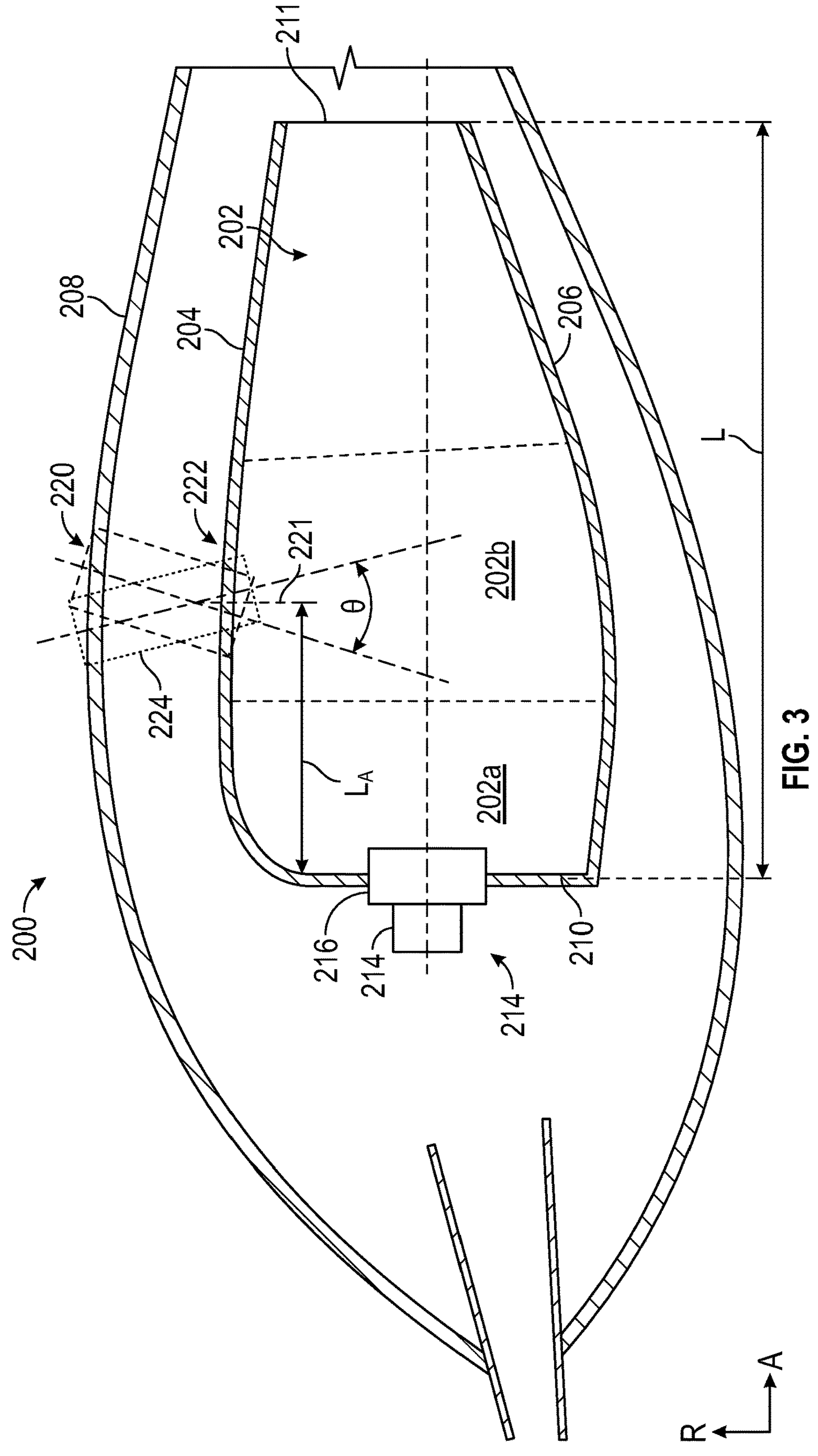
FIG. 3 is a schematic cross-sectional view of the combustor of FIG. 2, according to the present disclosure.

FIG. 3 is a schematic cross-sectional view of the combustor 200. The combustor 200 is shown schematically in FIG. 3 and some components are not shown or labeled for clarity. As shown in FIG. 3, the plurality of second mixing assemblies 220 are oriented at a first angle θ with respect to the radial direction R. As shown by the dashed lines, the first angle θ can be positive or negative such that the plurality of second mixing assemblies 220 (shown in dashed lines in a positive orientation and in a negative orientation) injects the fuel 67 at the first angle θ with respect to the radial direction R. The first angle θ is in a range from −60° to 60°. Such a range of the first angle θ provides for greater mixing of the combustion gases generated by the plurality of second mixing assemblies 220 and the combustion gases generated by the plurality of first mixing assemblies 212 as compared to values of the first angle θ that are outside (e.g., greater than or less than) the range.

The combustion chamber 202 includes a length L measured in the axial direction A from the annular dome 210 to the combustion chamber outlet 211. The plurality of second mixing assemblies 220 are disposed at an axial location on the combustion chamber 202. The plurality of second mixing assemblies 220 are disposed at an axial length $L_A$ measured from the annular dome 210 to a longitudinal centerline axis 221 of the plurality of second mixing assemblies 220. A ratio of the axial length $L_A$ to the length L of the combustion chamber 202 ($L_A/L$) is in a range of 0.2 to 0.8. Such a range of $L_A/L$ provides for an axial location of the plurality of second mixing assemblies 220 such that the combustion gases from the plurality of second mixing assemblies 220 adequately mix with the combustion gases from the plurality of first mixing assemblies 212 prior to entering the turbine section 27 (FIG. 1), while also being downstream from the plurality of first mixing assemblies 212 such that the combustion process generated by the plurality of second mixing assemblies 220 does not interfere with the combustion process of the plurality of first mixing assemblies 212.

Figure 4:
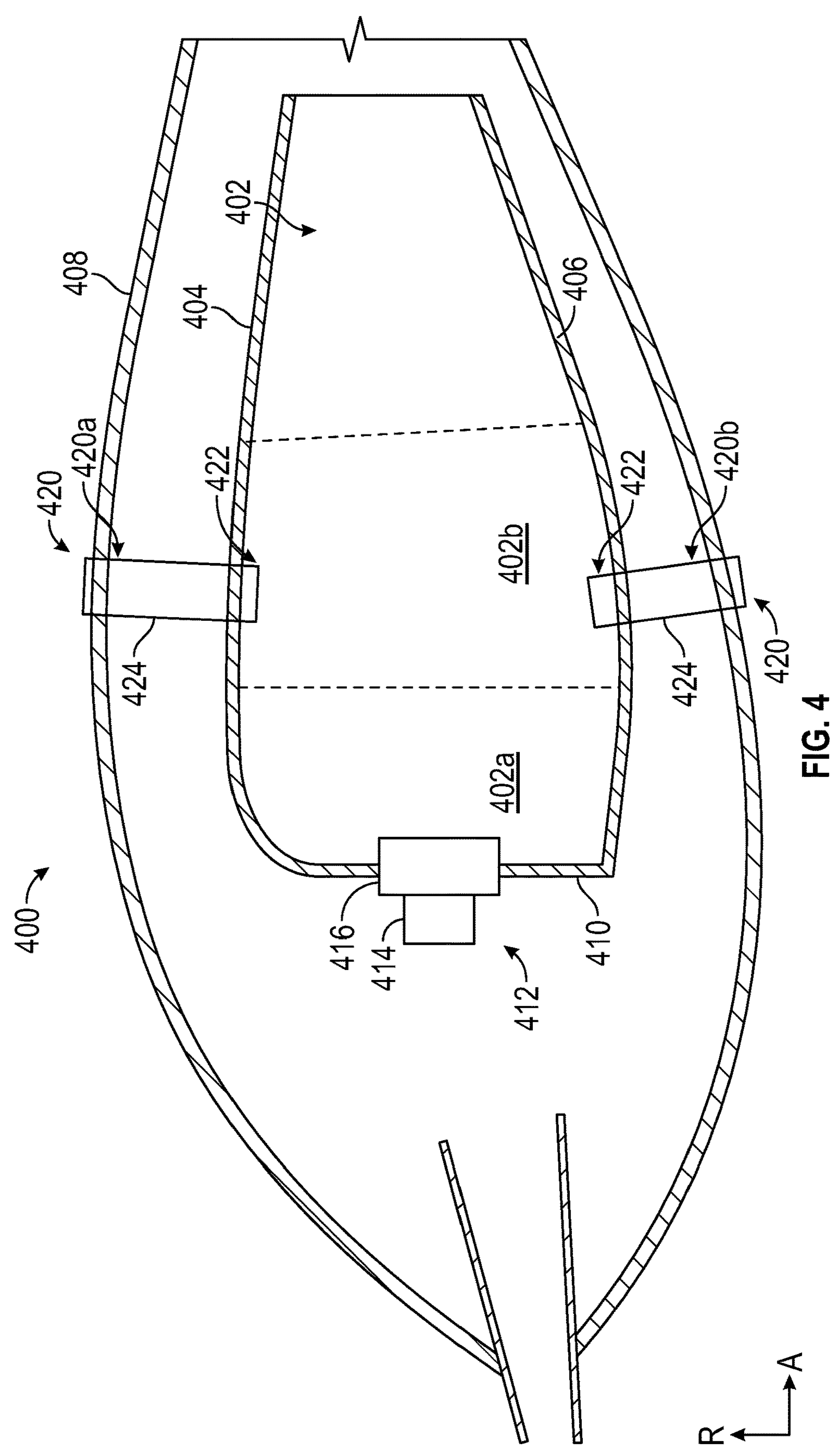
FIG. 4 is a schematic cross-sectional view of a combustor for a turbine engine, taken along a longitudinal centerline axis of the turbine engine, according to another embodiment.

FIG. 4 is a schematic cross-sectional view of a combustor 400 for a turbine engine, taken along a longitudinal centerline axis of the turbine engine, according to another embodiment. The combustor 400 is substantially similar to the combustor 200 of FIGS. 2 and 3, and includes the same or similar components. For example, the combustor 400 includes a combustion chamber 402, an outer liner 404 and an inner liner 406 spaced radially inward from an annular combustor casing 408, and an annular dome 410. The combustor 400 also includes a plurality of first mixing assemblies 412 having a pilot mixer 414 and a first main mixer 416 that inject fuel into a first combustion zone 402*a*, and a plurality of second mixing assemblies 420 having a second main mixer 422 and a second fuel injector 424 that inject fuel into a second combustion zone 402*b*.

The plurality of second mixing assemblies 420 includes a first plurality of second mixing assemblies 420*a* spaced circumferentially about the outer liner 404, and a second plurality of second mixing assemblies 420*b* spaced circumferentially about the inner liner 406. Accordingly, the combustor 400 is the same as the combustor 200 of FIG. 2, except the combustor 400 includes a plurality of second mixing assemblies 420 on the inner liner 406 as well as the outer liner 404. The first plurality of second mixing assemblies 420*a* and the second plurality of second mixing assemblies 420*b* can be oriented at the first angle θ (FIG. 2) with respect to the radial direction R, as detailed above.

Figures 5, 6, 7:
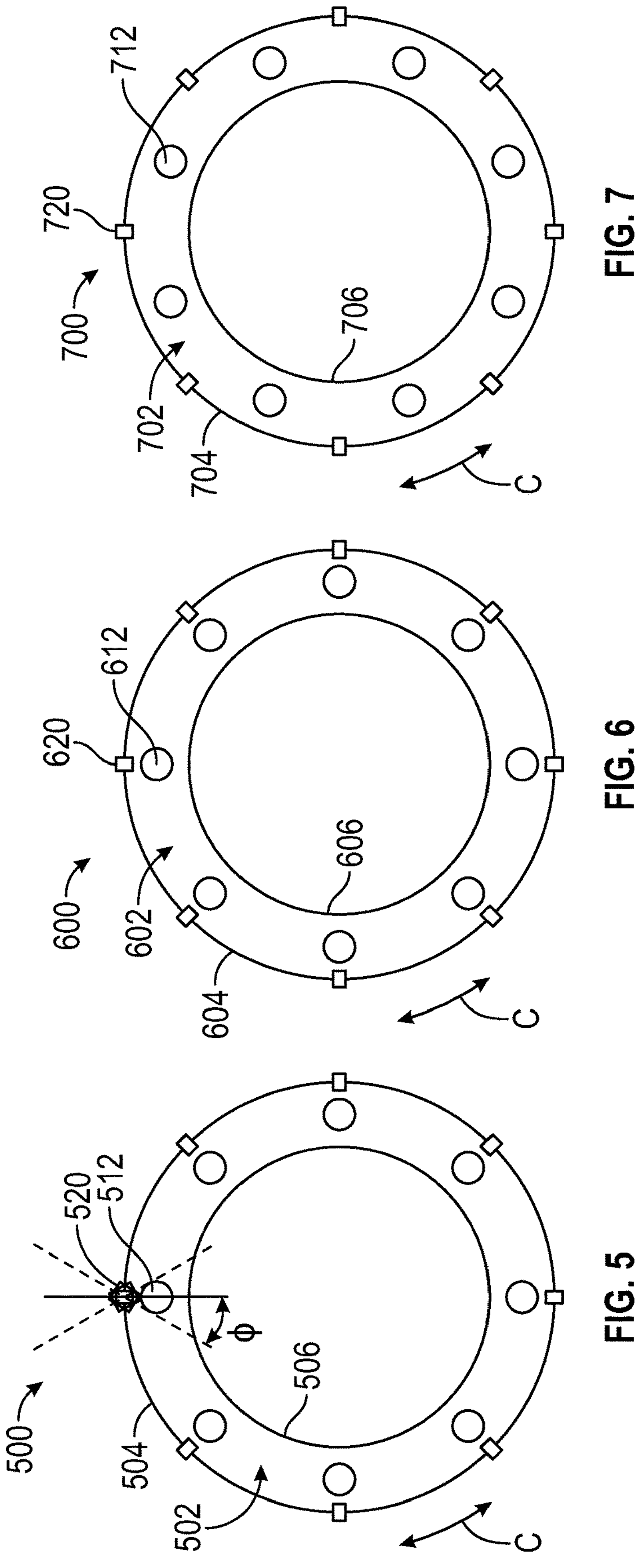
FIG. 5 is a schematic front view of a combustor, according to another embodiment.
FIG. 6 is a schematic front view of a combustor, according to another embodiment.
FIG. 7 is a schematic front view of a combustor, according to another embodiment.

FIG. 5 is a schematic front view of a combustor 500, according to another embodiment. The combustor 500 is substantially similar to the combustor 200 of FIG. 2. For example, the combustor 500 includes a combustion chamber 502, an outer liner 504, an inner liner 506, a plurality of first mixing assemblies 512, and a plurality of second mixing assemblies 520. The plurality of second mixing assemblies 520 are oriented at a second angle ϕ with respect to the circumferential direction C. As shown by the dashed lines, the second angle ϕ can be positive or negative such that the plurality of second mixing assemblies 520 injects the fuel at the second angle ϕ with respect to the circumferential direction C. The second angle ϕ is in a range from −80° to 80°. Such a range of the second angle ϕ provides for greater mixing of the combustion gases generated by the plurality of second mixing assemblies 520 and the combustion gases generated by the plurality of first mixing assemblies 512 as compared to values of the second angle ϕ that are outside (e.g., greater than or less than) the range.

FIG. 6 is a schematic front view of a combustor 600, according to another embodiment. The combustor 600 is substantially similar to the combustor 200 of FIG. 2. For example, the combustor 600 includes a combustion chamber 602, an outer liner 604, an inner liner 606, a plurality of first mixing assemblies 612, and a plurality of second mixing assemblies 620. As shown in FIG. 6, the plurality of first mixing assemblies 612 and the plurality of second mixing assemblies 620 are circumferentially aligned about the circumferential direction C. Aligning the plurality of first mixing assemblies 612 and the plurality of second mixing assemblies 620 circumferentially allows the combustion gases generated by the plurality of first mixing assemblies 612 to mix with the combustion gases generated by the plurality of second mixing assemblies 620 for a complete reaction prior to exiting the combustion chamber 602.

FIG. 7 is a schematic front view of a combustor 700, according to another embodiment. The combustor 700 is substantially similar to the combustor 200 of FIG. 2. For example, the combustor 700 includes a combustion chamber 702, an outer liner 704, an inner liner 706, a plurality of first mixing assemblies 712, and a plurality of second mixing assemblies 720. As shown in FIG. 7, the plurality of first mixing assemblies 712 and the plurality of second mixing assemblies 720 are circumferentially misaligned about the circumferential direction C. Misaligning the plurality of first mixing assemblies 712 and the plurality of second mixing assemblies 720 circumferentially reduces the interaction of the plurality of first mixing assemblies 712 and the plurality of second mixing assemblies 720 so the combustion process of the plurality of second mixing assemblies 720 does not interfere with the combustion process of the plurality of second mixing assemblies 720.

Figures 8, 9, 10:
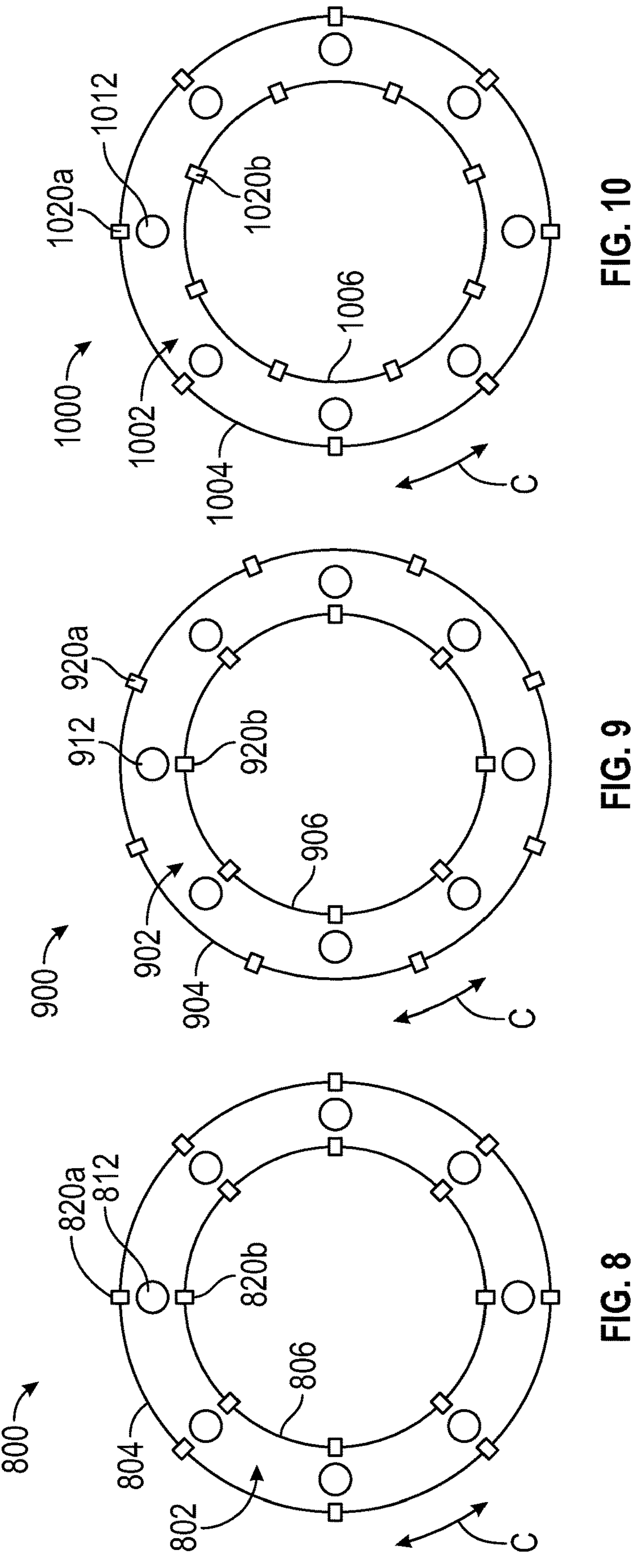
FIG. 8 is a schematic front view of a combustor, according to another embodiment.
FIG. 9 is a schematic front view of a combustor, according to another embodiment.
FIG. 10 is a schematic front view of a combustor, according to another embodiment.

FIG. 8 is a schematic front view of a combustor 800, according to another embodiment. The combustor 800 is substantially similar to the combustors 200, 400 of FIGS. 2 and 4, respectively. For example, the combustor 800 includes a combustion chamber 802, an outer liner 804, an inner liner 806, a plurality of first mixing assemblies 812, a first plurality of second mixing assemblies 820*a*, and a second plurality of second mixing assemblies 820*b*. As shown in FIG. 8, the plurality of first mixing assemblies 812, the first plurality of second mixing assemblies 820*a*, and the second plurality of second mixing assemblies 820*b* are circumferentially aligned about the circumferential direction C.

FIG. 9 is a schematic front view of a combustor 900, according to another embodiment. The combustor 900 is substantially similar to the combustors 200, 400 of FIGS. 2 and 4, respectively. For example, the combustor 900 includes a combustion chamber 902, an outer liner 904, an inner liner 906, a plurality of first mixing assemblies 912, a first plurality of second mixing assemblies 920*a*, and a second plurality of second mixing assemblies 920*b*. As shown in FIG. 9, the plurality of first mixing assemblies 912 and the second plurality of second mixing assemblies 920*b* are circumferentially aligned about the circumferential direction C, while the first plurality of second mixing assemblies 920*a* are circumferentially misaligned with the first mixing assemblies 912 and the second plurality of second mixing assemblies 920*b*.

FIG. 10 is a schematic front view of a combustor 1000, according to another embodiment. The combustor 1000 is substantially similar to the combustors 200, 400 of FIGS. 2 and 4, respectively. For example, the combustor 1000 includes a combustion chamber 1002, an outer liner 1004, an inner liner 1006, a plurality of first mixing assemblies 1012, a first plurality of second mixing assemblies 1020*a*, and a second plurality of second mixing assemblies 1020*b*. As shown in FIG. 10, the plurality of first mixing assemblies 1012 and the first plurality of second mixing assemblies 1020*a* are circumferentially aligned about the circumferential direction C, while the second plurality of second mixing assemblies 1020*b* are circumferentially misaligned with the first mixing assemblies 1012 and the first plurality of second mixing assemblies 1020*a*.

Figure 11:
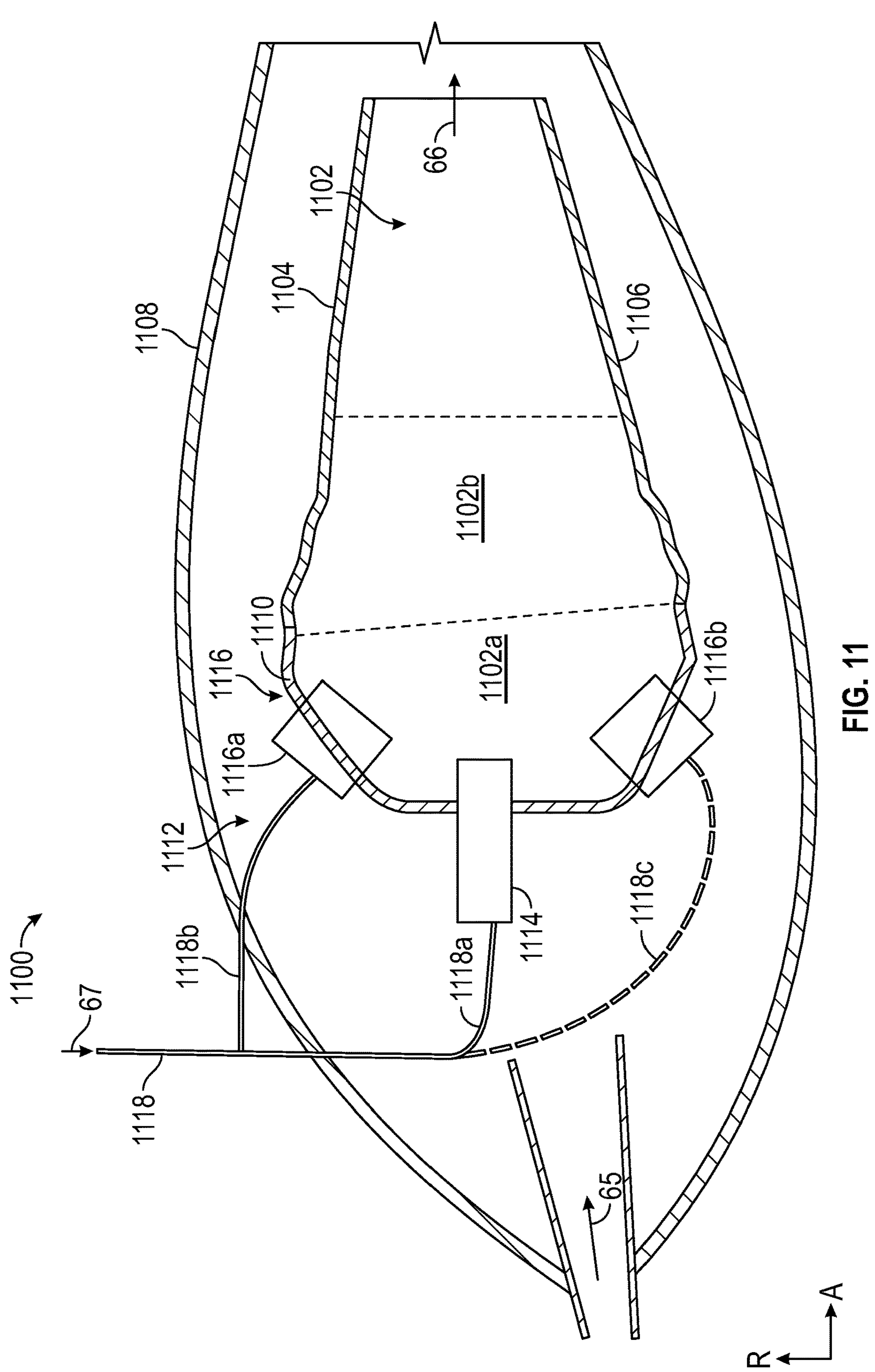
FIG. 11 is a schematic cross-sectional view of a combustor for a turbine engine, taken along a longitudinal centerline axis of the turbine engine, according to another embodiment.

FIG. 11 is a schematic cross-sectional view of a combustor 1100 for a turbine engine, taken along a longitudinal centerline axis of the turbine engine, according to another embodiment. The combustor 1100 is substantially similar to the combustor 200 of FIG. 2. The combustor 1100 includes a combustion chamber 1102, an outer liner 1104, an inner liner 1106, an annular combustor casing 1108, an annular dome 1110, a plurality of mixing assemblies 1112 having a pilot mixer 1114 and a plurality of main mixers 1116, and a fuel injector 1118. The annular dome 1110 wraps around to form a portion of the length of the combustion chamber 1102 such that the annular dome 1110 has a radial component and an axial component. The pilot mixer 1114 is oriented and functions the same as the pilot mixer 214 of FIG. 2.

The plurality of main mixers 1116 includes a first main mixer 1116*a* and a second main mixer 1116*b*. The first main mixer 1116*a* and the second main mixer 1116*b* function the same as the first main mixer 216 and the second main mixer 222 of FIG. 2. However, the first main mixer 1116*a* and the second main mixer 1116*b* are located on the annular dome 1110 at an angle with respect to the axial direction A such that the first main mixer 1116*a* and the second main mixer 1116*b* inject a fuel-air mixture that has an axial component and a radial component. In this way, the combustor 1100 provides for radial staging and axial staging similar to the combustor 200 of FIG. 2. The fuel injector 1118 includes a first branch line 1118*a* coupled to, and in flow communication with, the pilot mixer 1114, a second branch line 1118*b* coupled to, and in flow communication with, the first main mixer 1116*a*, and a third branch line 1118*c* coupled to, and in flow communication with, the second main mixer 1116*b*. In this way, the fuel 67 can be split among the pilot mixer 1114, the first main mixer 1116*a*, and the second main mixer 1116*b* similarly to the fuel 67 splits described with respect to FIG. 2.

In a first mode, the compressed air 65 and the fuel 67 are staged among the pilot mixer 1114, the first main mixer 1116*a*, and the second main mixer 1116*b*. The pilot mixer 1114 injects a fuel-rich fuel-air mixture into a first combustion zone 1102*a* of the combustion chamber 1102. The first main mixer 1116*a* and the second main mixer 1116*b* inject a fuel-lean fuel-air mixture into the first combustion zone 1102*a* and into a second combustion zone 1102*b*. In a second mode, the pilot mixer 1114 provides a fuel-rich fuel-air mixture, and the first main mixer 1116*a* is provided with the compressed air 65 and the fuel 67 such that the first main mixer 1116*a* provides a fuel-rich fuel-air mixture. In the second mode, the second main mixer 1116*b* operates ultra lean such that almost no fuel, or no fuel, is provided to the second main mixer 1116*b*. In this way, the second main mixer 1116*b* provides essentially only the compressed air 65 into the combustion chamber 1102, thereby generating turbulent mixing in the combustion chamber 1102. The turbulent mixing helps to increase mixing of the fuel 67 and the compressed air 65 as compared to if there is no turbulent mixing.

Figure 12:
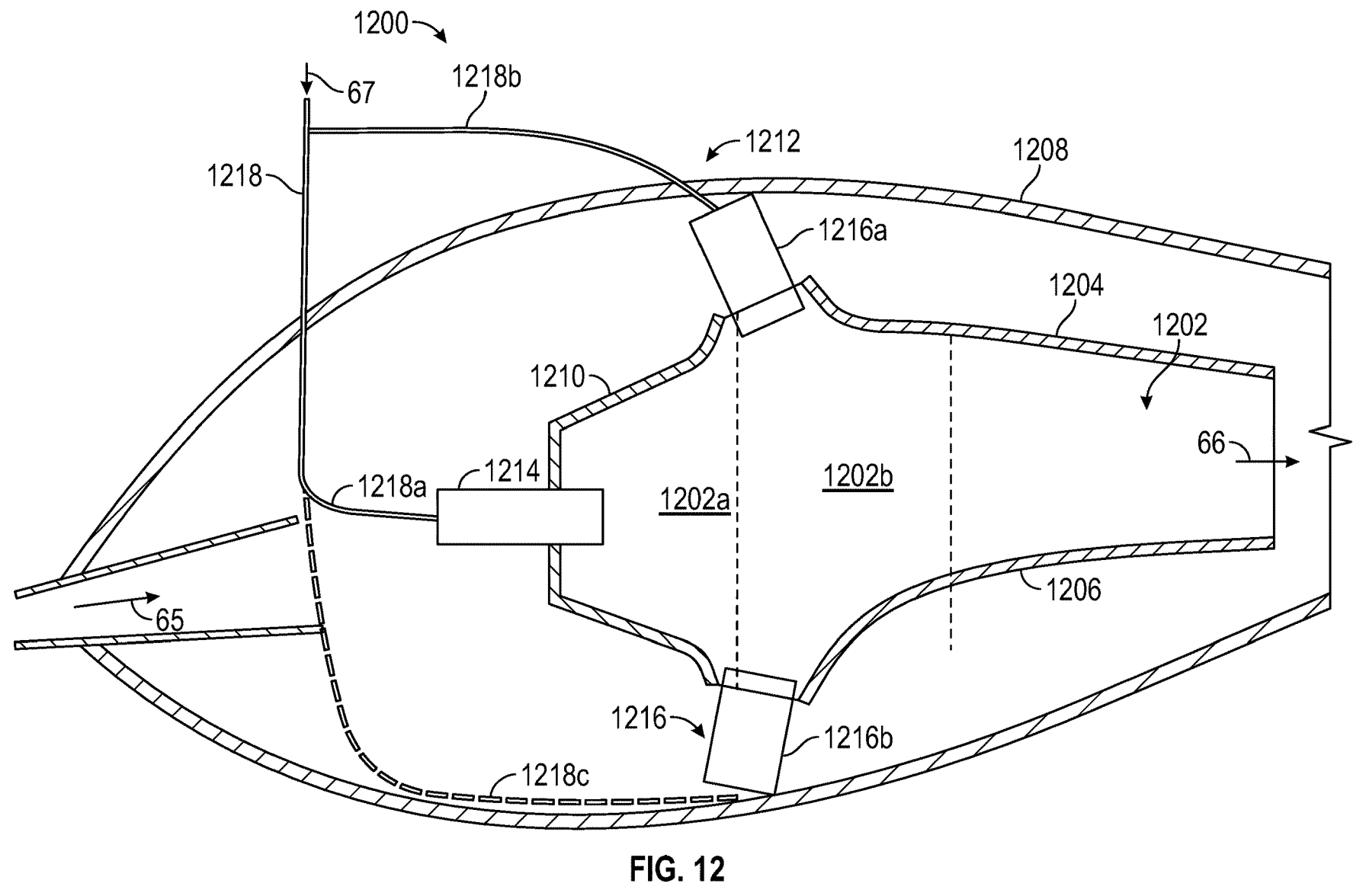

FIG. 12 is a schematic cross-sectional view of a combustor 1200 for a turbine engine, taken along a longitudinal centerline axis of the turbine engine, according to another embodiment. The combustor 1200 is substantially similar to the combustors 200, 1100 of FIGS. 2 and 11, respectively. The combustor 1200 includes a combustion chamber 1202, an outer liner 1204, an inner liner 1206, an annular combustor casing 1208, an annular dome 1210, a plurality of mixing assemblies 1212 having a pilot mixer 1214 and a plurality of main mixers 1216, and a fuel injector 1218. The annular dome 1210 wraps around to form a portion of the length of the combustion chamber 1202 such that the annular dome 1210 has a radial component and an axial component. The pilot mixer 1214 is oriented and functions the same as the pilot mixer 214 of FIG. 2, and injects the fuel-air mixture into a first combustion zone 1202*a*.

The plurality of main mixers 1216 includes a first main mixer 1216*a* and a second main mixer 1216*b*. The first main mixer 1216*a* and the second main mixer 1216*b* function the same as the first main mixer 1116*a* and the second main mixer 1116*b* of FIG. 11. For example, the first main mixer 1216*a* and the second main mixer 1216*b* are located on the annular dome 1210 at an angle with respect to the axial direction A such that the first main mixer 1216*a* and the second main mixer 1216*b* inject a fuel-air mixture that has an axial component and a radial component. However, the first main mixer 1216*a* and the second main mixer 1216*b* are located to inject the fuel-air mixture directly into a second combustion zone 1202*b* downstream of the first combustion zone 1202*a*. In this way, the combustor 1100 provides for radial staging and axial staging similar to the combustor 200 of FIG. 2. The fuel injector 1218 includes a first branch line 1218*a* coupled to, and in flow communication with, the pilot mixer 1214, a second branch line 1218*b* coupled to, and in flow communication with, the first main mixer 1216*a*, and a third branch line 1218*c* coupled to, and in flow communication with, the second main mixer 1216*b*. In this way, the fuel 67 can be split among the pilot mixer 1214, the first main mixer 1216*a*, and the second main mixer 1216*b* similarly to the fuel 67 splits described with respect to FIG. 2.

In a first mode, the compressed air 65 and the fuel 67 are staged among the pilot mixer 1214, the first main mixer 1216*a*, and the second main mixer 1216*b*. The pilot mixer 1214 injects a fuel-rich fuel-air mixture into a first combustion zone 1202*a* of the combustion chamber 1202. The first main mixer 1216*a* and the second main mixer 1216*b* inject a fuel-lean fuel-air mixture into the second combustion zone 1202*b*. In a second mode, the pilot mixer 1214 provides a fuel-rich fuel-air mixture, and the first main mixer 1216*a* is provided with the compressed air 65 and the fuel 67 such that the first main mixer 1216*a* provides a fuel-rich fuel-air mixture. In the second mode, the second main mixer 1216*b* operates ultra lean such that almost no fuel, or no fuel, is provided to the second main mixer 1216*b*. In this way, the second main mixer 1216*b* provides essentially only the compressed air 65 into the combustion chamber 1202, thereby generating turbulent mixing in the combustion chamber 1202.

Figure 13:
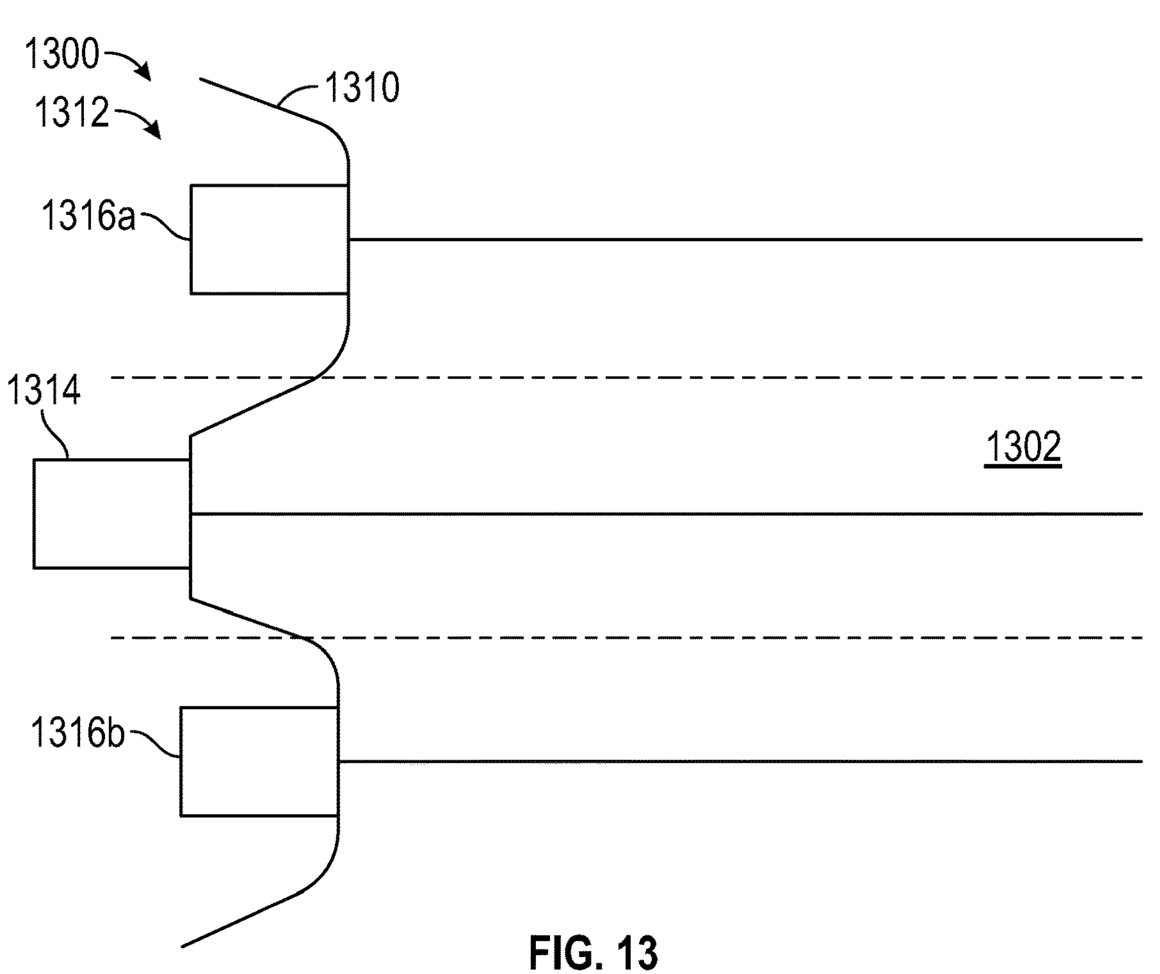
FIG. 13 is a schematic side view of a combustor, according to another embodiment.

FIG. 13 is a schematic side view of a combustor 1300, according to another embodiment. The combustor 1300 includes a combustion chamber 1302, an annular dome 1310, and a plurality of mixing assemblies 1312 including a pilot mixer 1314, a first main mixer 1316*a*, and a second main mixer 1316*b*. Many of the components of the combustor 1300 are not shown in FIG. 13, but the combustor 1300 includes the same or similar components as any of the combustors detailed herein.

The pilot mixer 1314, the first main mixer 1316*a*, and the second main mixer 1316*b* are located on the annular dome 1310. The annular dome 1310 is shaped such that the first main mixer 1316*a* and the second main mixer 1316*b* are located axially aft of the pilot mixer 1314. The pilot mixer 1314 injects the fuel-air mixture axially, and the first main mixer 1316*a* and the second main mixer 1316*b* inject the fuel-air mixture radially, as detailed above with respect to FIG. 2. In this way, the first main mixer 1316*a* and the second main mixer 1316*b* inject the fuel-air mixture radially and axially aft of the pilot mixer 1314. Thus, the combustor 1300 provides for radial staging and axial staging of the fuel and the air. The first main mixer 1316*a* and the second main mixer 1316*b* can be staged with different fuel circuits (e.g., different branch lines) similar to the first main mixer 1116*a* and the second main mixer 1116*b* of FIG. 11 to achieve an improved exit profile of the fuel-air mixture. The first main mixer 1316*a* and the second main mixer 1316*b* can be positioned radially along the centerline of the pilot mixer 1314 or can be positioned radially outward or radially inward of the pilot mixer 1314.

The first main mixer 1316*a* and the second main mixer 1316*b* are operational under low power conditions (e.g., idle, approach, etc.) with nominal residence time allowing for reduced $NO_x$ and controlled exit profile. The pilot mixer 1314 is operational at high power conditions (e.g., take-off or climb) such that the first main mixer 1316*a* and the second main mixer 1316*b* operate at nominal desired fuel-to-air ratios (FARs) and the pilot mixer 1314 is sized for excess fuel required to meet the high FARs. The nominal FARs are such that the pilot mixer 1314 is fuel-rich at low power conditions for operability of the combustor 1300 and the first main mixer 1316*a* and the second main mixer 1316*b* are fuel-lean at high power conditions for low $NO_x$ emissions.

Figure 14:
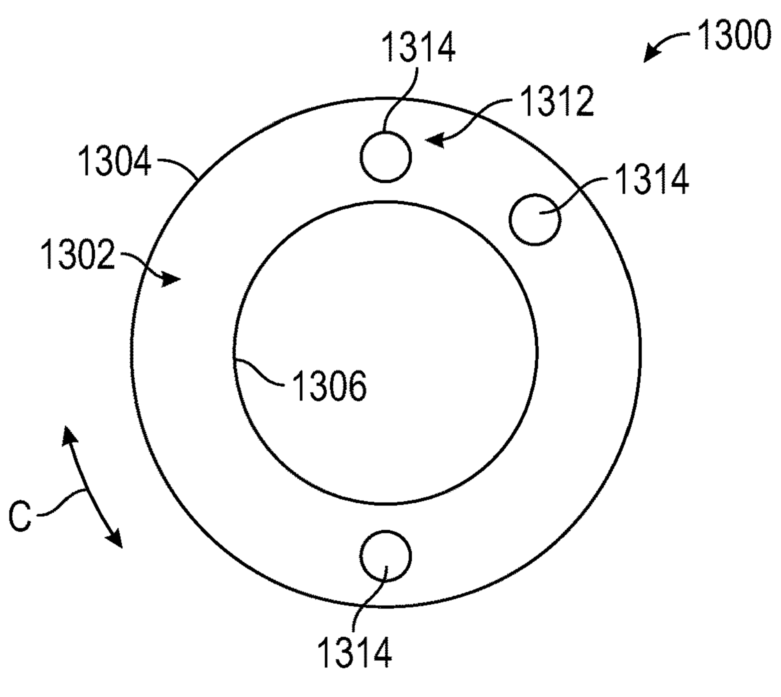
FIG. 14 is a schematic front view of the combustor of FIG. 13, according to the present disclosure.

FIG. 14 is a schematic front view of the combustor 1300, according to the present disclosure. As shown in FIG. 14, the combustor 1300 includes an outer liner 1304 and an inner liner 1306. Each of the pilot mixers 1314 of the plurality of mixing assemblies 1312 is staggered circumferentially about the circumferential direction C of the combustor 1300. In this way, the spacing between the pilot mixers 1314 is non-uniform. In some embodiments, the pilot mixers 1314 can be spaced uniformly about the circumferential direction C.

Figure 15:
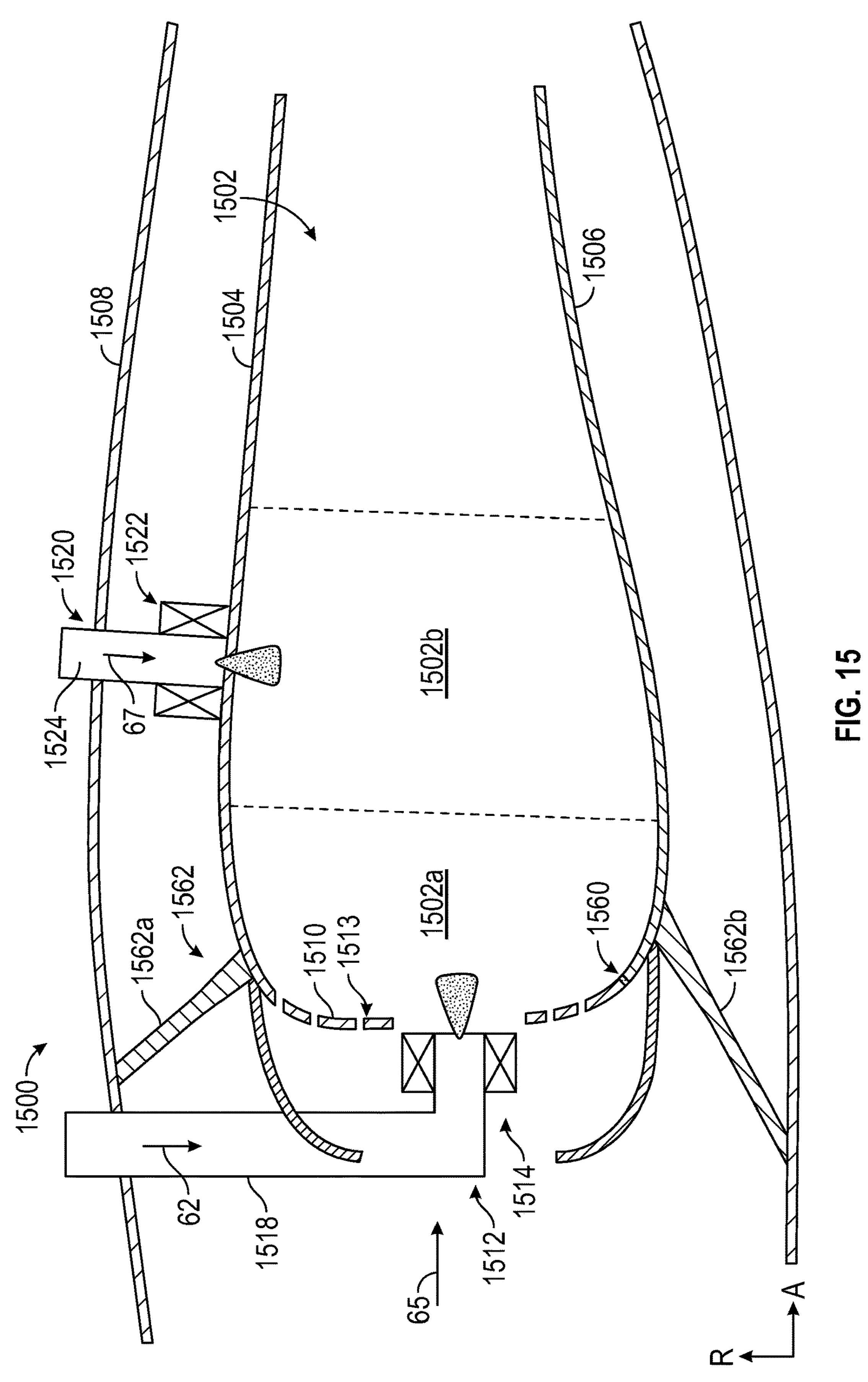
FIG. 15 is a schematic, cross-sectional view of a combustor for the turbine engine of FIG. 1, taken along a longitudinal centerline axis of the turbine engine, according to another embodiment.

FIG. 15 is a schematic, cross-sectional view of a combustor 1500 for the turbine engine 10 (FIG. 1), taken along a longitudinal centerline axis 12 (FIG. 1) of the turbine engine, according to another embodiment. The combustor 1500 is substantially similar to the combustor 200 of FIG. 2. The combustor 1500 includes a combustion chamber 1502, an outer liner 1504, an inner liner 1506, an annular combustor casing 1508, an annular dome 1510, a plurality of first mixing assemblies 1512 each having a pilot mixer 1514 and a first fuel injector 1518, and a plurality of second mixing assemblies 1520 each having a second main mixer 1522 and a second fuel injector 1524. The plurality of first mixing assemblies 1512, however, does not include a main mixer. In this way, the combustor 1500 is a rich burn combustor and the pilot mixer 1514 injects the fuel-air mixture axially only with no radial component into a first combustion zone 1502*a* of the combustion chamber 1502. The plurality of second mixing assemblies 1520 functions the same as the plurality of second mixing assemblies 220 of FIG. 2, and inject the fuel-air mixture into a second combustion zone 1502*b* axially downstream of the first combustion zone 1502*a*.

In FIG. 15, the annular dome 1510 is a wrapped annular dome such that the annular dome 1510 and the outer liner 1504 form a single, unitary component. In this way, the number of joints between the annular dome 1510 and the outer liner 1504 and inner liner 1506 is reduced compared to annular domes that do not form a single, unitary component with the outer liner or the inner liner. The annular dome 1510 is coupled to the inner liner 1506 at an inner liner joint 1560. The inner liner joint 1560 can include any type of joint or coupling mechanism, such as, for example, welding, bolts, or the like. The annular dome 1510 includes one or more dome cooling holes 1513 that operably direct the compressed air 65 therethrough to cool a hot side (e.g., aft side) of the annular dome 1510.

The annular dome 1510 and the outer liner 1504 can be made out of a ceramic matrix composite (CMC). When a component comprises or includes "CMC" or "CMC material," the component may include one of, or combinations of one or more of the ceramic matrix composite materials described herein. Such component may also include non-ceramic matrix composite materials, such as a metal alloy.

More specifically, CMC refers to a class of materials that includes a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration ("MI") with silicon, or a cure or pyrolysis to yield a silicon carbide matrix in the preform, and subsequent chemical vapor infiltration ("CVI") with silicon carbide. Additional steps may be taken to improve densification of the preform, either before or after chemical vapor infiltration, by injecting the preform with a liquid resin or a polymer followed by a thermal processing step to fill the voids with silicon carbide. CMC material as used herein may be formed using any known methods or hereafter developed including but not limited to melt infiltration, chemical vapor infiltration, polymer impregnation pyrolysis (PIP), and any combination thereof.

Such materials, along with certain monolithic ceramics (i.e., ceramic materials without a reinforcing material), are particularly suitable for higher temperature applications. Additionally, these ceramic materials are lightweight compared to metal alloys (e.g., superalloys), yet can still provide strength and durability to the component made therefrom. Therefore, such materials are currently being considered for many turbine engine components used in higher temperature sections of gas turbine engines, such as components of the combustor, and other like components, that would benefit from the lighter-weight and higher temperature capability these materials can offer.

In some embodiments, the annular dome 1510 and the outer liner 1504 are made from large forging. For example, large forging includes shaping a metal using localized compressive forces (e.g., compressive forces applied by a hammer or a die). In some embodiments, the annular dome 1510 and the outer liner 1504 are made using casting. For example, casting is a manufacturing process in which a liquid material is poured into a mold, which contains a hollow cavity of the desired shape of the annular dome 1510 and the outer liner 1504.

The combustion chamber 1502 is coupled to, or mounted to, the annular combustor casing 1508 by one or more mounting structures 1562. The one or more mounting structures 1562 can include, for example, beams, rods, or the like. The one or more mounting structures 1562 can include a single mounting structure at a discrete location on the combustion chamber 1502 or can include a plurality of mounting structures disposed circumferentially about the combustion chamber 1502. The one or more mounting structures 1562 include one or more first mounting structures **1562*a* and one or more second mounting structures 1562*b*. The one or more first mounting structures 1562*a* are located at a forward end of the annular dome 1510 and the outer liner 1504, and extend from a radially outer surface of the annular dome 1510 and the outer liner 1504 to a radially inner surface of the annular combustor casing 1508. The one or more second mounting structures 1562*b* are located at a forward end of the inner liner 1506 and extend from a radially outer surface of the inner liner 1506 to a radially inner surface of the annular combustor casing 1508. The one or more mounting structures 1562 help to secure the combustion chamber 1502 and absorb and distribute vibrations from the combustion chamber 1502 in order to stabilize the combustion chamber 1502** during operation.

Figure 16:
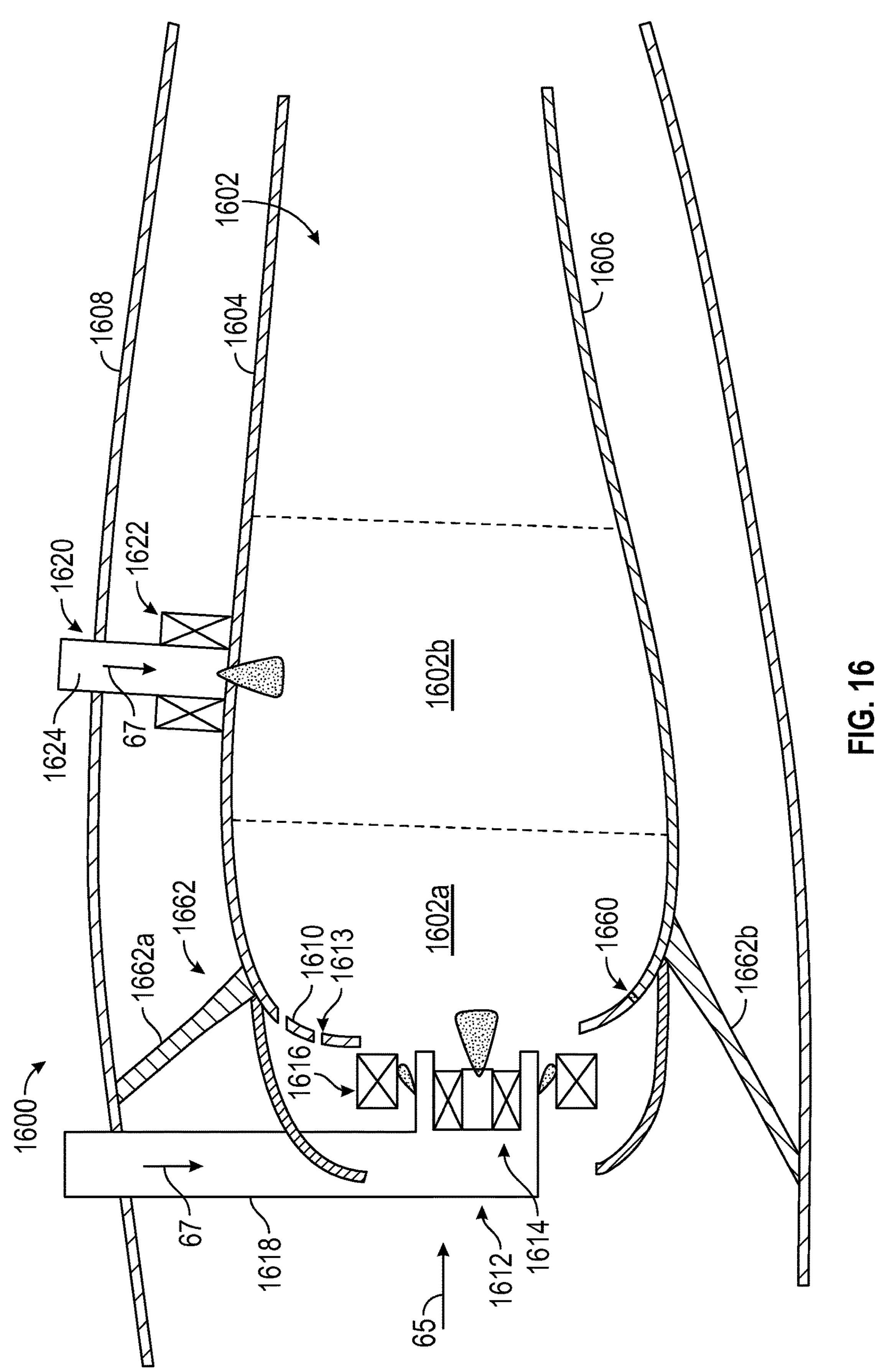
FIG. 16 is a schematic, cross-sectional view of a combustor for the turbine engine of FIG. 1, taken along a longitudinal centerline axis of the turbine engine, according to another embodiment.

FIG. 16 is a schematic, cross-sectional view of a combustor 1600 for the turbine engine 10 (FIG. 1), taken along a longitudinal centerline axis 12 (FIG. 1) of the turbine engine, according to another embodiment. The combustor 1600 is substantially similar to the combustor 200 of FIG. 2. The combustor 1600 includes a combustion chamber 1602, an outer liner 1604, an inner liner 1606, an annular combustor casing 1608, an annular dome 1610, a plurality of first mixing assemblies 1612 each having a pilot mixer 1614, a first main mixer 1616, and a first fuel injector 1618, and a plurality of second mixing assemblies 1620 each having a second main mixer 1622 and a second fuel injector 1624. In this way, the combustor 1600 is a lean burn combustor. The pilot mixer 1614 injects the fuel-air mixture axially and the first main mixer 1616 injects the fuel-air mixture radially into a first combustion zone **1602*a* of the combustion chamber 1602. The plurality of second mixing assemblies 1620 functions the same as the plurality of second mixing assemblies 220 of FIG. 2, and inject the fuel-air mixture into a second combustion zone 1602*b* axially downstream of the first combustion zone 1602*a***.

In FIG. 16, the annular dome 1610 is a wrapped annular dome such that the annular dome 1610 and the outer liner 1604 form a single, unitary component. The annular dome 1610 is coupled to the inner liner 1606 at an inner liner joint 1660. The annular dome 1610 includes one or more dome cooling holes 1613 that operably direct the compressed air 65 therethrough to cool a hot side (e.g., aft side) of the annular dome 1610.

The combustion chamber 1602 is coupled to, or mounted to, the annular combustor casing 1608 by one or more mounting structures 1662. The one or more mounting structures 1662 include one or more first mounting structures **1662*a* and one or more second mounting structures 1662*b*. The one or more first mounting structures 1662*a* and the one or more second mounting structures 1662*b* are substantially similar to the mounting structures 1562 of FIG. 15**.

Figure 17:
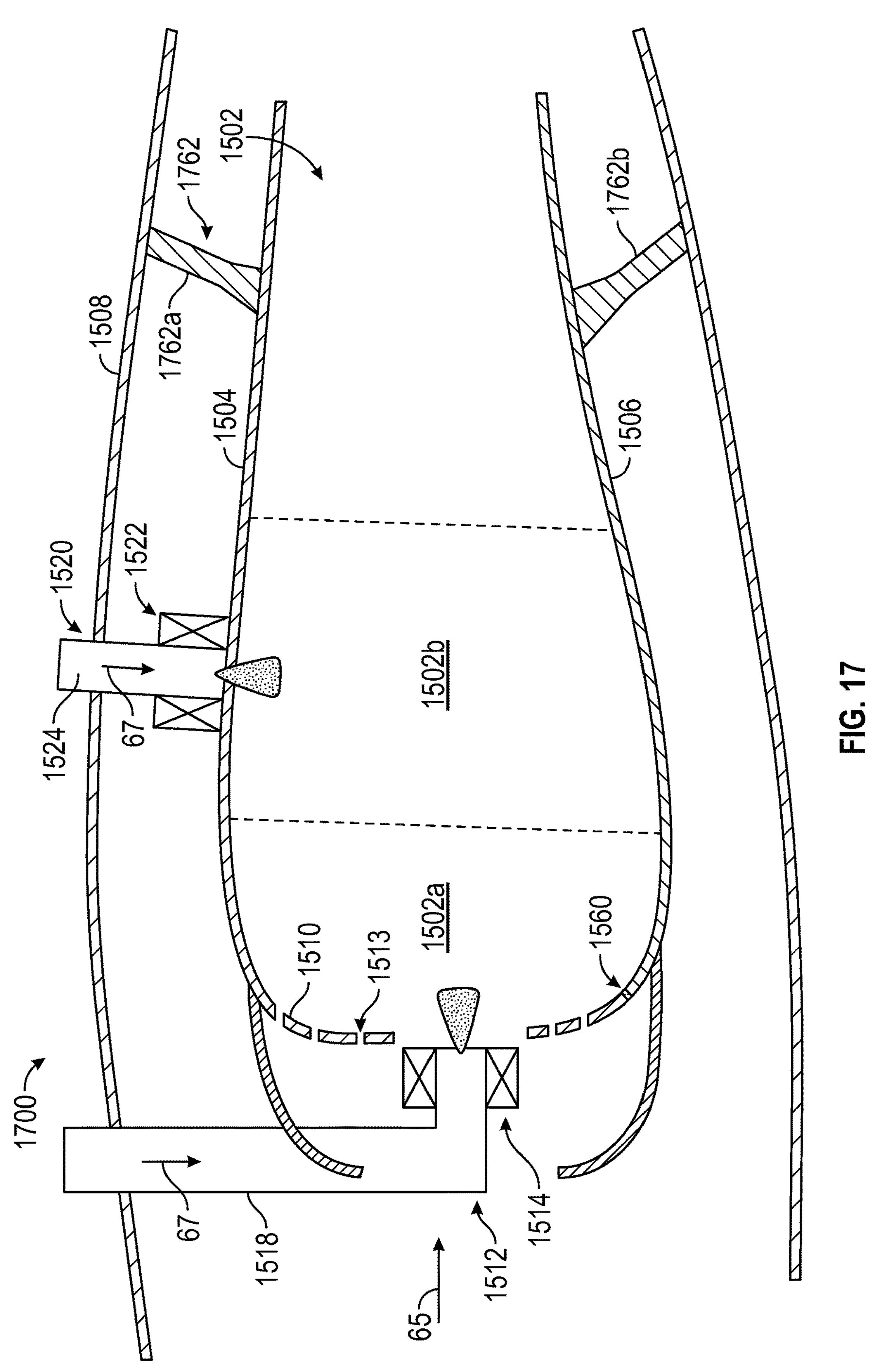
FIG. 17 is a schematic, cross-sectional view of a combustor for the turbine engine of FIG. 1, taken along a longitudinal centerline axis of the turbine engine, according to another embodiment.

FIG. 17 is a schematic, cross-sectional view of a combustor 1700 for the turbine engine 10 (FIG. 1), taken along a longitudinal centerline axis 12 (FIG. 1) of the turbine engine, according to another embodiment. The combustor 1700 is substantially similar to the combustor 1500 of FIG. 15 and includes many of the same or similar components. The combustor 1700 includes one or more mounting structures 1762 including one or more first mounting structures 1762*a* and one or more second mounting structures 1762*b*.

The one or more first mounting structures 1762*a* are located at an aft end of the annular dome 1510 and the outer liner 1504, and extend from a radially outer surface of the annular dome 1510 and the outer liner 1504 to a radially inner surface of the annular combustor casing 1508. The one or more second mounting structures 1762*b* are located at an aft end of the inner liner 1506 and extend from a radially outer surface of the inner liner 1506 to a radially inner surface of the annular combustor casing 1508. The one or more mounting structures 1762 help to secure the combustion chamber 1502 and absorb and distribute vibrations from the combustion chamber 1502 in order to stabilize the combustion chamber 1502 during operation.

Figure 18:
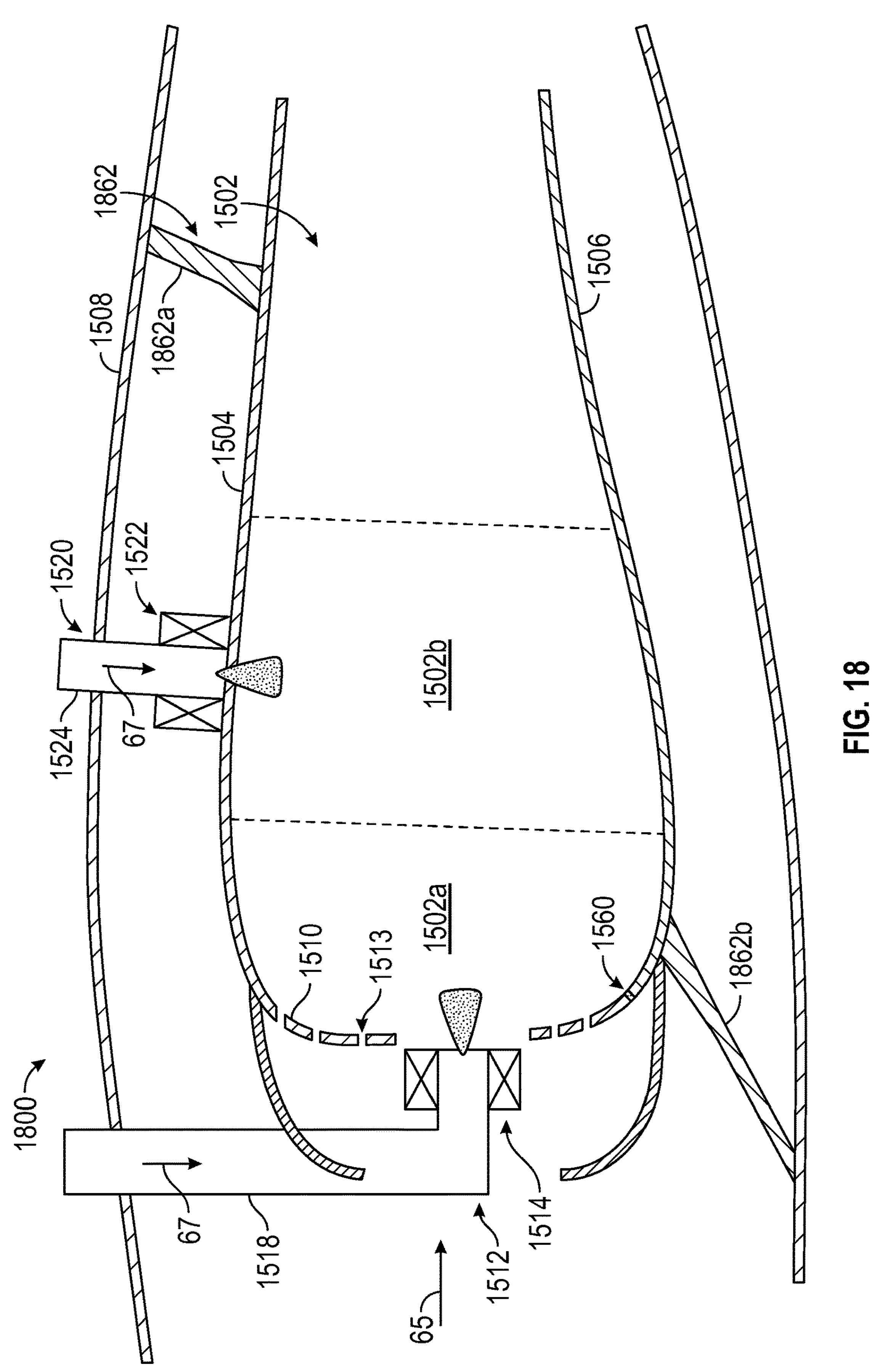
FIG. 18 is a schematic, cross-sectional view of a combustor for the turbine engine of FIG. 1, taken along a longitudinal centerline axis of the turbine engine, according to another embodiment.

FIG. 18 is a schematic, cross-sectional view of a combustor 1800 for the turbine engine 10 (FIG. 1), taken along a longitudinal centerline axis 12 (FIG. 1) of the turbine engine, according to another embodiment. The combustor 1800 is substantially similar to the combustor 1500 of FIG. 15 and includes many of the same or similar components. The combustor 1800 includes one or more mounting structures 1862 including one or more first mounting structures 1862*a* and one or more second mounting structures 1862*b*.

The one or more first mounting structures 1862*a* are located at an aft end of the annular dome 1510 and the outer liner 1504, and extend from a radially outer surface of the annular dome 1510 and the outer liner 1504 to a radially inner surface of the annular combustor casing 1508. The one or more second mounting structures 1862*b* are located at a forward end of the inner liner 1506 and extend from a radially outer surface of the inner liner 1506 to a radially inner surface of the annular combustor casing 1508. The one or more mounting structures 1862 help to secure the combustion chamber 1502 and absorb and distribute vibrations from the combustion chamber 1502 in order to stabilize the combustion chamber 1502 during operation.

Figure 19:
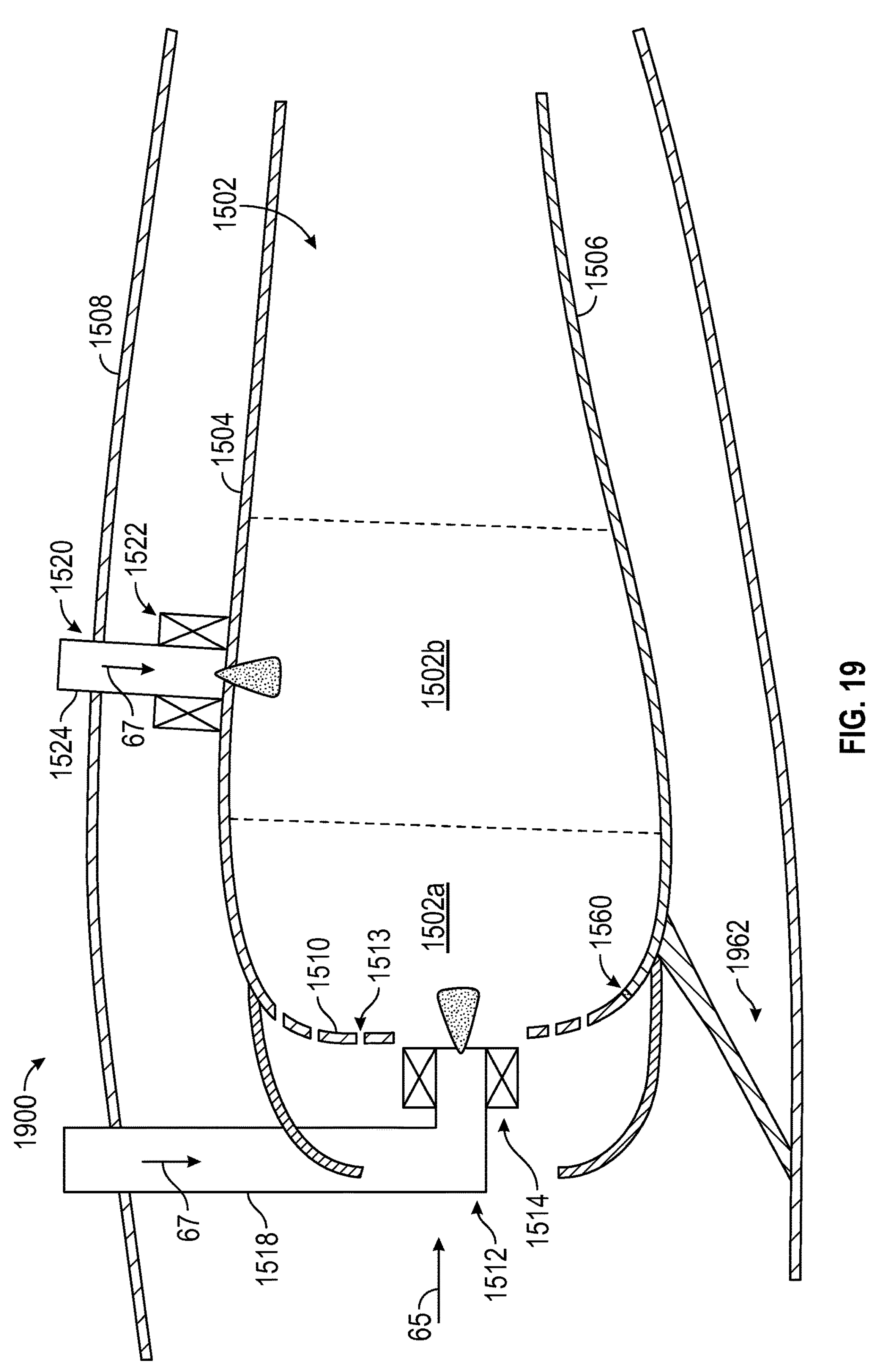
FIG. 19 is a schematic, cross-sectional view of a combustor for the turbine engine of FIG. 1, taken along a longitudinal centerline axis of the turbine engine, according to another embodiment.

FIG. 19 is a schematic, cross-sectional view of a combustor 1900 for the turbine engine 10 (FIG. 1), taken along a longitudinal centerline axis 12 (FIG. 1) of the turbine engine, according to another embodiment. The combustor 1900 is substantially similar to the combustor 1500 of FIG. 15 and includes many of the same or similar components. The combustor 1900 includes one or more mounting structures 1962.

The one or more mounting structures 1962 are located at a forward end of the inner liner 1506 and extend from a radially outer surface of the inner liner 1506 to a radially inner surface of the annular combustor casing 1508. The combustor 1900 does not include mounting structures between the outer liner 1504 and the annular combustor casing 1508. The one or more mounting structures 1962 help to secure the combustion chamber 1502 and absorb and distribute vibrations from the combustion chamber 1502 in order to stabilize the combustion chamber 1502 during operation.

Figure 20:
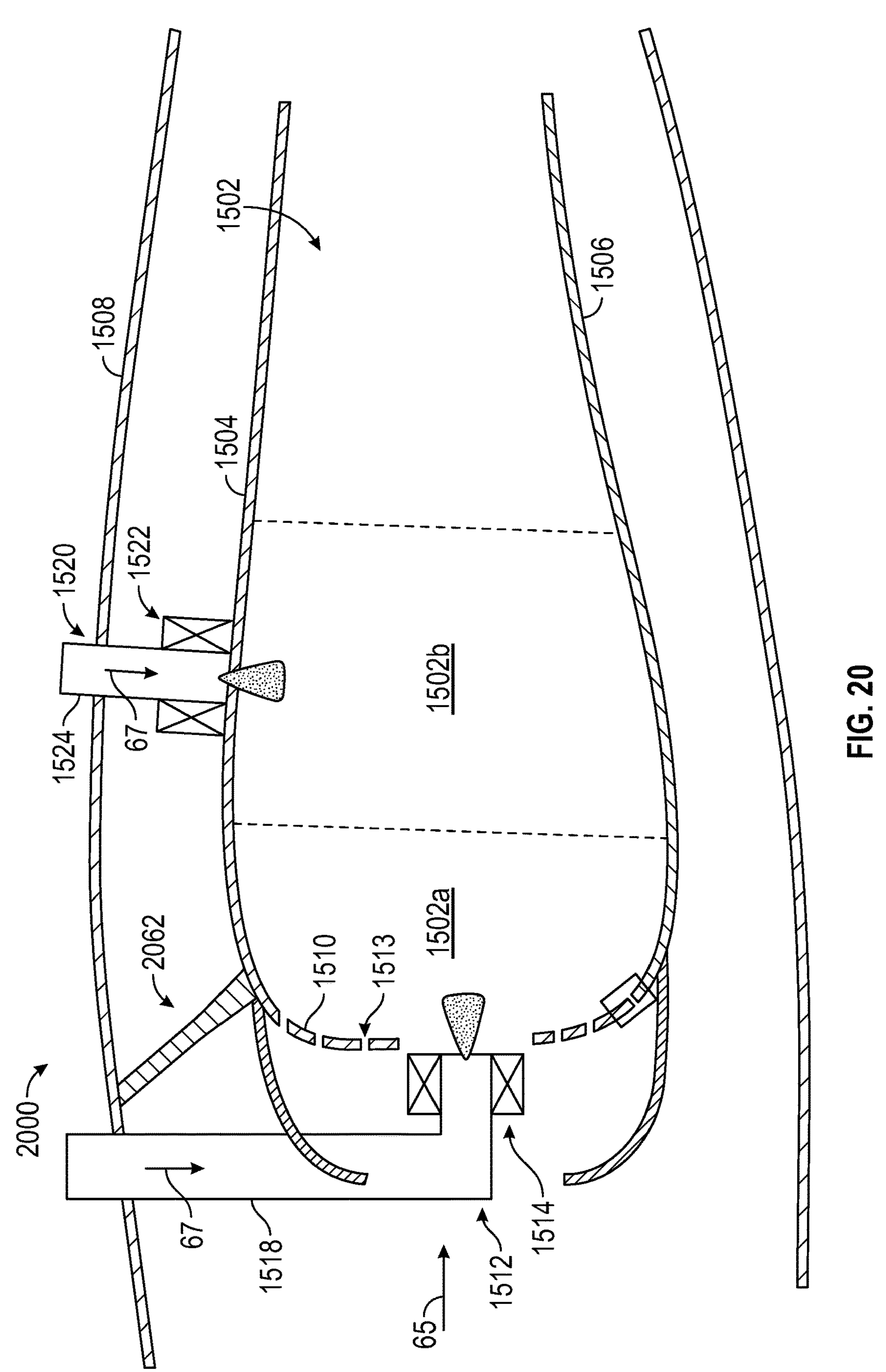
FIG. 20 is a schematic, cross-sectional view of a combustor for the turbine engine of FIG. 1, taken along a longitudinal centerline axis of the turbine engine, according to another embodiment.

FIG. 20 is a schematic, cross-sectional view of a combustor 2000 for the turbine engine 10 (FIG. 1), taken along a longitudinal centerline axis 12 (FIG. 1) of the turbine engine, according to another embodiment. The combustor 2000 is substantially similar to the combustor 1500 of FIG. 15 and includes many of the same or similar components. The combustor 2000 includes one or more mounting structures 2062.

The one or more mounting structures 2062 are located at an aft end of the annular dome 1510 and the outer liner 1504, and extend from a radially outer surface of the annular dome 1510 and the outer liner 1504 to a radially inner surface of the annular combustor casing 1508. The combustor 2000 does not include mounting structures between the inner liner 1506 and the annular combustor casing 1508. The one or more mounting structures 2062 help to secure the combustion chamber 1502 and absorb and distribute vibrations from the combustion chamber 1502 in order to stabilize the combustion chamber 1502 during operation.

The embodiments detailed in FIGS. 15 to 20 describe both aft mounted combustors (e.g., combustors with mounting structures at an aft end of the combustor) and forward mounted combustors (e.g., combustors with mounting structures at a forward end of the combustor). Forward mounted combustors better manage the tolerance and the thermal growth at the mixing assembly locations, but have more of a mismatch of the tolerance and thermal growth at the turbine interface (e.g., at the aft end) as compared to aft mounted combustors. Aft mounted combustors have better control of the tolerance and the thermal growth at the turbine interface, but have more difficulty controlling tolerance and thermal growth at the mixing assembly locations (e.g., at the forward end). Forward mounted combustors also have better natural frequency control as compared to aft mounted combustors.

The embodiments detailed herein provide for a hybrid staged combustor including radial staging and axial staging combined, thereby, providing for improved stoichiometric capabilities in the combustor, while reducing $NO_x$ emissions, across the entire mission operating cycle of a turbine engine. The radial staging and axial staging together provide for greater $NO_x$ reductions, while allowing for leaner fuel-air ratios to the pilot mixer and the first main mixer or the second main mixer, as compared to combustors without the benefit of the present disclosure.

Further aspects of the present disclosure are provided by the subject matter of the following clauses.

A turbine engine comprises a combustor comprising a combustion chamber including an outer liner and an inner liner, the combustion chamber defining a radial direction, an axial direction, and a circumferential direction, and an annular dome coupled to the outer liner and the inner liner at a forward end of the combustion chamber, a plurality of first mixing assemblies each having a pilot mixer and a first main mixer, the plurality of first mixing assemblies disposed through the annular dome, the pilot mixer operably injecting a pilot fuel-air mixture axially into a first combustion zone of the combustion chamber, and the first main mixer operably injecting a first main mixer fuel-air mixture radially into the first combustion zone, and a plurality of second mixing assemblies each having a second main mixer, the plurality of second mixing assemblies disposed through at least one of the outer liner or the inner liner axially aft of the plurality of first mixing assemblies, the second main mixer operably injecting a second main mixer fuel-air mixture radially into a second combustion zone of the combustion chamber, the second combustion zone being axially aft of, and separate from, the first combustion zone.

The turbine engine of the preceding clause, the combustion chamber including a length L in the axial direction measured from the annular dome to a combustion chamber outlet, the second main mixer being disposed on the outer liner or the inner liner at an axial length $L_A$ measured from the annular dome to a longitudinal centerline axis of the second main mixer, and a ratio $(L_A/L)$ of the axial length $L_A$ of the second main mixer to the length L of the combustion chamber is in a range from 0.2 to 0.8.

The turbine engine of any preceding clause, the plurality of second mixing assemblies being located on the outer liner.

The turbine engine of any preceding clause, the plurality of second mixing assemblies being located on the inner liner.

The turbine engine of any preceding clause, the annular dome being a wrapped annular dome such that the annular dome and the outer liner form a single, unitary component.

The turbine engine of any preceding clause, further comprising an annular combustor casing that surrounds the combustion chamber, the combustion chamber being coupled to the annular combustor casing by one or more mounting structures.

The turbine engine of any preceding clause, the second main mixer being disposed at a first angle θ with respect to the radial direction, the first angle θ being in a range from −60° to 60°.

The turbine engine of any preceding clause, the second main mixer being disposed at a second angle ϕ with respect to the circumferential direction, the second angle ϕ being in a range from −80° to 80°.

The turbine engine of any preceding clause, further comprising a fuel system that operably provides fuel splits to the pilot mixer, the first main mixer, and the second main mixer such that the pilot mixer operates fuel-rich, the first main mixer operates fuel-lean, and the second main mixer operates more fuel-lean than the first main mixer.

The turbine engine of any preceding clause, the fuel system operably providing the fuel to the pilot mixer, the first main mixer, and the second main mixer such that the pilot mixer or the pilot mixer, and the first main mixer and/or the second main mixer operate at a low power operation of the turbine engine, and the pilot mixer, the first main mixer, and the second main mixer operate at a mid-level power operation or a high power operation of the turbine engine.

The turbine engine of any preceding clause, the combustion chamber extending from the annular dome to a combustion chamber outlet.

The turbine engine of any preceding clause, the plurality of first mixing assemblies being spaced circumferentially about the annular dome.

The turbine engine of any preceding clause, each first mixing assembly being a twin annular premixing swirler (TAPS).

The turbine engine of any preceding clause, further comprising a plurality of first fuel injectors each coupled in flow communication with a respective first mixing assembly.

The turbine engine of any preceding clause, the plurality of second mixing assemblies being spaced circumferentially about the outer liner or the inner liner.

The turbine engine of any preceding clause, further comprising a plurality of second fuel injectors each coupled in flow communication with a respective second mixing assembly.

The turbine engine of any preceding clause, low power operation being less than 30% of sea level static (SLS) maximum engine rated thrust.

The turbine engine of any preceding clause, mid-level power operation being from 30% to 85% of the SLS maximum engine rated thrust.

The turbine engine of any preceding clause, high power operation being greater than 85% of the SLS maximum engine rated thrust.

The turbine engine of any preceding clause, the first main mixer swirling the first main mixer fuel-air mixture in a first swirl direction.

The turbine engine of any preceding clause, the second main mixer swirling the second main mixer fuel-air mixture in a second swirl direction.

The turbine engine of any preceding clause, the second swirl direction being the same as the first swirl direction.

The turbine engine of any preceding clause, the second swirl direction being different from the first swirl direction.

The turbine engine of any preceding clause, the combustor operably directing a first portion of compressed air to the pilot mixer, a second portion of compressed air to the first main mixer, and a third portion of compressed air to the second main mixer.

The turbine engine of any preceding clause, the first portion of compressed air including 7% to 20% of the compressed air provided to the pilot mixer, the second portion of compressed air including 30% to 60% of the compressed air provided to the first main mixer, and the third portion of compressed air including 11% to 30% of the compressed air provided to the second main mixer.

The turbine engine of any preceding clause, the pilot mixer generating a pilot fuel stream such that the pilot fuel-air mixture operates fuel-rich, the first main mixer generating a first main fuel stream such that the first main mixer fuel-air mixture operates fuel-lean, and the second main mixer generating a second main fuel stream such that the second main mixer fuel-air mixture operates more fuel-lean than the first main mixer fuel-air mixture.

The turbine engine of any preceding clause, the pilot fuel stream including 90% to 100% of the fuel during idle conditions of the turbine engine, 35% to 50% of the fuel during approach conditions of the turbine engine, 20% to 40% of the fuel during cruise conditions of the turbine engine, and 5% to 20% of the fuel during climb conditions or take-off conditions of the turbine engine.

The turbine engine of any preceding clause, the first main fuel stream including 0% to 5% of the fuel during idle conditions of the turbine engine, 50% to 58% of the fuel during approach conditions of the turbine engine, 55% to 70% of the fuel during cruise conditions of the turbine engine, and 65% to 72% of the fuel during climb conditions or take-off conditions of the turbine engine.

The turbine engine of any preceding clause, the second main fuel stream including 0% to 5% of the fuel during idle conditions of the turbine engine, 0% to 7% of the fuel during approach conditions of the turbine engine, 5% to 10% of the fuel during cruise conditions of the turbine engine, and 15% to 23% of the fuel during climb conditions or take-off conditions of the turbine engine.

The turbine engine of any preceding clause, the combustor operably directing the compressed air through the annular dome, through the outer liner and the inner liner in an area forward of the plurality of second mixing assemblies, and through the outer liner and the inner liner in an area aft of the plurality of second mixing assemblies.

The turbine engine of any preceding clause, the combustor operably directing 5% to 9% of the compressed air to the annular dome, 7% to 10% of the compressed air to the outer liner and the inner liner in the area forward of the plurality of second mixing assemblies, and 6% to 9% of the compressed air to the outer liner and the inner liner in an area aft of the plurality of second mixing assemblies.

The turbine engine of any preceding clause, the annular dome including one or more cooling holes to provide the compressed air through the annular dome into the combustion chamber.

The turbine engine of any preceding clause, the outer liner including one or more cooling holes to provide the compressed air through the outer liner into the combustion chamber.

The turbine engine of any preceding clause, the inner liner including one or more cooling holes to provide the compressed air through the outer liner into the combustion chamber.

The turbine engine of any preceding clause, the plurality of first mixing assemblies and the plurality of second mixing assemblies being circumferentially aligned about the circumferential direction.

The turbine engine of any preceding clause, the plurality of first mixing assemblies and the plurality of second mixing assemblies being circumferentially misaligned about the circumferential direction.

The turbine engine of any preceding clause, the plurality of second mixing assemblies including a first plurality of mixing assemblies on the outer liner and a second plurality of second mixing assemblies on the inner liner.

The turbine engine of any preceding clause, the plurality of first mixing assemblies, the first plurality of second mixing assemblies, and the second plurality of second mixing assemblies being circumferentially aligned about the circumferential direction.

The turbine engine of any preceding clause, the plurality of first mixing assemblies and the second plurality of second mixing assemblies being circumferentially aligned about the circumferential direction, and the first plurality of second mixing assemblies being circumferentially misaligned about the circumferential direction with the plurality of first mixing assemblies and the second plurality of second mixing assemblies.

The turbine engine of any preceding clause, the plurality of first mixing assemblies and the first plurality of second mixing assemblies being circumferentially aligned about the circumferential direction, and the second plurality of second mixing assemblies being circumferentially misaligned about the circumferential direction with the plurality of first mixing assemblies and the first plurality of second mixing assemblies.

The turbine engine of any preceding clause, the first main mixer and the second main mixer being located on the annular dome.

The turbine engine of any preceding clause, the first main mixer and the second main mixer being angled with respect to the axial direction such that the first main mixer fuel-air mixture and the second main mixer fuel-air mixture each includes an axial component and a radial component.

The turbine engine of any preceding clause, the fuel injector including a first branch line in flow communication with the pilot mixer, a second branch line in flow communication with the first main mixer, and a third branch line in flow communication with the second main mixer.

The turbine engine of any preceding clause, in a first mode, the first main mixer and the second main mixer injecting a fuel-lean fuel-air mixture into the first combustion zone and the second combustion zone.

The turbine engine of any preceding clause, in a second mode, the second main mixer injecting almost no fuel, or no fuel, such that the second main mixer provides essentially only compressed air into the combustion chamber, thereby generating turbulent mixing.

The turbine engine of any preceding clause, the first main mixer and the second main mixer located to inject the fuel-air mixture directly into the second combustion zone.

The turbine engine of any preceding clause, the annular dome being shaped such that the first main mixer and the second main mixer are located axially aft of the pilot mixer.

The turbine engine of any preceding clause, the first main mixer and the second main mixer being operated under low power conditions.

The turbine engine of any preceding clause, the pilot mixer being operated at high power conditions.

The turbine engine of any preceding clause, each of the pilot mixers of the plurality of first mixing assemblies being staggered circumferentially about the circumferential direction of the combustor such that the spacing between the pilot mixer of each of the plurality of first mixing assemblies is non-uniform.

The turbine engine of any preceding clause, the annular dome being made of a ceramic matrix composite (CMC).

The turbine engine of any preceding clause, the annular dome and the outer liner being formed from forging.

The turbine engine of any preceding clause, the annular dome and the outer liner being formed from casting.

The turbine engine of any preceding clause, the one or more mounting structures including beams or rods.

The turbine engine of any preceding clause, the one or more mounting structures including one or more first mounting structures that extend from the outer liner to the annular combustor casing.

The turbine engine of any preceding clause, the one or more mounting structures including one or more second mounting structures that extend from the inner liner to the annular combustor casing.

The turbine engine of any preceding clause, the one or more mounting structures being located at a forward end of the combustion chamber.

The turbine engine of any preceding clause, the one or more mounting structures being located at an aft end of the combustion chamber.

The turbine engine of any preceding clause, the one or more first mounting structures being located at an aft end of the combustion chamber, and the one or more second mounting structures being located at a forward end of the combustion chamber.

The turbine engine of any preceding clause, the annular dome being coupled to the inner liner at an inner liner joint.

The turbine engine of any preceding clause, the inner liner joint including welding or bolts.

A combustor for a turbine engine, the turbine engine being the turbine engine of any preceding clause.

A method of operating the turbine engine of any preceding clause, the method comprising generating the pilot fuel-air mixture with the pilot mixer, injecting the pilot fuel-air mixture axially into the first combustion zone of the combustion chamber, generating the first main mixer fuel-air mixture with the first main mixer, injecting the first main mixer fuel-air mixture radially from the first main mixer and into the first combustion zone of the combustion chamber, generating the second main mixer fuel-air mixture with the second main mixer, and injecting the second main mixer fuel-air mixture radially into the second combustion zone of the combustion chamber.

The method of the preceding clause, further comprising operating the pilot mixer, the first main mixer, and the second main mixer during a mid-level power operation or a high power operation of the turbine engine.

The method of any preceding clause, further comprising operating the pilot mixer during a low power operation of the turbine engine.

The method of any preceding clause, further comprising operating the pilot mixer, and the first main mixer and/or the second main mixer during a low power operation of the turbine engine.

The method of any preceding clause, further comprising operably directing a first portion of compressed air to the pilot mixer, a second portion of compressed air to the first main mixer, and a third portion of compressed air to the second main mixer.

The method of any preceding clause, the first portion of compressed air including 7% to 20% of the compressed air provided to the combustor, the second portion of compressed air includes 30% to 60% of the compressed air provided to the combustor, and the third portion of compressed air includes 11% to 30% of the compressed air provided to the combustor.

The method of any preceding clause, further comprising generating a pilot fuel stream with the pilot mixer such that the pilot fuel-air mixture operates fuel-rich, generating a first main fuel stream with the first main mixer such that the first main mixer fuel-air mixture operates fuel-lean, and generating a second main fuel stream with the second main mixer such that the second main mixer fuel-air mixture operates more fuel-lean than the first main mixer fuel-air mixture.

The method of any preceding clause, the pilot fuel stream including 90% to 100% of the fuel during idle conditions of the turbine engine, 35% to 50% of the fuel during approach conditions of the turbine engine, 20% to 40% of the fuel during cruise conditions of the turbine engine, and 5% to 20% of the fuel during climb conditions or take-off conditions of the turbine engine.

The method of any preceding clause, the first main fuel stream including 0% to 5% of the fuel during idle conditions of the turbine engine, 50% to 58% of the fuel during approach conditions of the turbine engine, 55% to 70% of the fuel during cruise conditions of the turbine engine, and 65% to 72% of the fuel during climb conditions or take-off conditions of the turbine engine.

The method of any preceding clause, the second main fuel stream including 0% to 5% of the fuel during idle conditions of the turbine engine, 0% to 7% of the fuel during approach conditions of the turbine engine, 5% to 10% of the fuel during cruise conditions of the turbine engine, and 15% to 23% of the fuel during climb conditions or take-off conditions of the turbine engine.

The method of any preceding clause, the turbine engine being the turbine engine of any preceding clause.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A turbine engine comprising:

a combustor configured to receive compressed air and comprising:

a combustion chamber including an outer liner and an inner liner, the combustion chamber defining a radial direction, an axial direction, and a circumferential direction; and an annular dome coupled to the outer liner and the inner liner at a forward end of the combustion chamber;

a plurality of first mixing assemblies each having a pilot mixer and a first main mixer concentrically aligned with the pilot mixer and extending circumferentially about the pilot mixer, the plurality of first mixing assemblies disposed through the annular dome, the pilot mixer of each of the plurality of first mixing assemblies operably injecting a pilot fuel stream axially and a first portion of the compressed air to generate a pilot fuel-air mixture axially into a first combustion zone of the combustion chamber, and the first main mixer of each of the plurality of first mixing assemblies operably injecting a first main fuel stream radially outward into the first main mixer and a second portion of the compressed air radially inward into the first main mixer in a direction opposite the first main fuel stream to generate a first main mixer fuel-air mixture that is injected into the first combustion zone, wherein, the plurality of first mixing assemblies are sized such that the first portion of the compressed air is 7% to 20% of the compressed air provided to the combustor and the second portion of the compressed air is 30% to 60% of the compressed air provided to the combustor; and a plurality of second mixing assemblies each having a second main mixer, the plurality of second mixing assemblies disposed through at least one of the outer liner or the inner liner axially aft of the plurality of first mixing assemblies, the second main mixer of each of the plurality of second mixing assemblies operably injecting a second main fuel stream and a third portion of the compressed air to generate a second main mixer fuel-air mixture radially into a second combustion zone of the combustion chamber, the second combustion zone being axially aft of, and separate from, the first combustion zone, and wherein, the plurality of second mixing assemblies are sized such that the third portion of the compressed air is 11% to 30% of the compressed air provided to the combustor.

2. The turbine engine of claim 1, wherein the combustion chamber includes a length L in the axial direction measured from the annular dome to a combustion chamber outlet, and wherein, for each of the plurality of second mixing assemblies, the second main mixer being disposed on the outer liner or the inner liner at an axial length $L_A$ measured from the annular dome to a longitudinal centerline axis of the second main mixer, and a ratio $(L_A/L)$ of the axial length $L_A$ of the second main mixer to the length L of the combustion chamber is in a range from 0.2 to 0.8.

3. The turbine engine of claim 1, wherein the plurality of second mixing assemblies is located on the outer liner.

4. The turbine engine of claim 1, wherein the plurality of second mixing assemblies is located on the inner liner.

5. The turbine engine of claim 1, wherein the annular dome is a wrapped annular dome such that the annular dome and the outer liner form a single, unitary component.

6. The turbine engine of claim 1, further comprising an annular combustor casing that surrounds the combustion chamber, the combustion chamber being coupled to the annular combustor casing by one or more mounting structures.

7. The turbine engine of claim 1, wherein, for each of the plurality of second mixing assemblies, the second main mixer is disposed at a first angle $\theta$ with respect to the radial direction, the first angle $\theta$ being in a range from $-60°$ to $60°$.

8. The turbine engine of claim 7, wherein, for each of the plurality of second mixing assemblies, the second main mixer is disposed at a second angle $\phi$ with respect to the circumferential direction, the second angle $\phi$ being in a range from $-80°$ to $80°$.

9. The turbine engine of claim 1, further comprising a fuel system that operably provides fuel splits to the pilot mixer of each of the plurality of first mixing assemblies, the first main mixer of each of the plurality of first mixing assemblies, and the second main mixer of each of the plurality of second mixing assemblies such that the pilot fuel-air mixture of each of the plurality of first mixing assemblies is fuel-rich, the first main mixer fuel-air mixture of each of the plurality of first mixing assemblies is fuel-lean, and the second main mixer fuel-air mixture of each of the plurality of second mixing assemblies is more fuel-lean than the first main mixer fuel-air mixture of each of the plurality of first mixing assemblies.

10. The turbine engine of claim 1, further comprising an igniter that ignites the pilot fuel-air mixture from the plurality of first mixing assemblies to generate a first flame in the first combustion zone, ignites the first main mixer fuel-air mixture from the plurality of first mixing assemblies to generate a second flame in the first combustion zone, and ignites the second main mixer fuel-air mixture from the plurality of second mixing assemblies to generate a third flame in the second combustion zone.

11. The turbine engine of claim 1, wherein the pilot fuel-air mixture and the first main mixer fuel-air mixture from the plurality of first mixing assemblies are combusted in a first combustion process to generate combustion gases in the first combustion zone, the second main mixer fuel-air mixture from the plurality of second mixing assemblies is combusted in a second combustion process to generate combustion gases in the second combustion zone, and the plurality of second mixing assemblies is positioned axially aft of the plurality of first mixing assemblies such that the combustion gases generated in the second combustion process mix with the combustion gases generated in the first combustion process downstream of the first combustion zone.

12. A method of operating the turbine engine of claim 1, the method comprising:

directing the pilot fuel stream and the first portion of the compressed air to the pilot mixer of each of the plurality of first mixing assemblies, wherein the first portion of the compressed air directed to the plurality of first mixing assemblies is 7% to 20% of the compressed air provided to the combustor;

generating the pilot fuel-air mixture with the pilot mixer of each of the plurality of first mixing assemblies;

injecting the pilot fuel-air mixture from the pilot mixer of each of the plurality of first mixing assemblies axially into the first combustion zone of the combustion chamber;

directing the first main fuel stream and the second portion of the compressed air to the first main mixer of each of the plurality of first mixing assemblies, wherein the second portion of the compressed air directed to the plurality of first mixing assemblies is 30% to 60% of the compressed air provided to the combustor;

generating the first main mixer fuel-air mixture with the first main mixer of each of the plurality of first mixing assemblies by injecting the first main fuel stream radially outward into the first main mixer of each of the plurality of first mixing assemblies and injecting the second portion of the compressed air radially inward into the first main mixer of each of the plurality of first mixing assemblies in a direction opposite the first main fuel stream;

injecting the first main mixer fuel-air mixture from the first main mixer of each of the plurality of first mixing assemblies into the first combustion zone of the combustion chamber;

directing the second main fuel stream and the third portion of the compressed air to the second main mixer of each of the plurality of second mixing assemblies, wherein the third portion of the compressed air directed to the plurality of second mixing assemblies is 11% to 30% of the compressed air provided to the combustor;

generating the second main mixer fuel-air mixture with the second main mixer of each of the plurality of second mixing assemblies; and injecting the second main mixer fuel-air mixture with the second main mixer of each of the plurality of second mixing assemblies radially into the second combustion zone of the combustion chamber.

13. The method of claim 12, further comprising operating the pilot mixer of each of the plurality of first mixing assemblies, the first main mixer of each of the plurality of first mixing assemblies, and the second main mixer of each of the plurality of second mixing assemblies during a mid-level power operation or a high power operation of the turbine engine.

14. The method of claim 13, further comprising operating the pilot mixer of each of the plurality of first mixing assemblies during a low power operation of the turbine engine.

15. The method of claim 13, further comprising operating the pilot mixer of each of the plurality of first mixing assemblies, and at least one of the first main mixer of each of the plurality of first mixing assemblies or the second main mixer of each of the plurality of second mixing assemblies during a low power operation of the turbine engine.

16. The method of claim 12, further comprising generating the pilot fuel stream with the pilot mixer of each of the plurality of first mixing assemblies such that the pilot fuel-air mixture with the pilot mixer of each of the plurality of first mixing assemblies is fuel-rich, generating the first main fuel stream with the first main mixer of each of the plurality of first mixing assemblies such that the first main mixer fuel-air mixture with the first main mixer of each of the plurality of first mixing assemblies is fuel-lean, and generating the second main fuel stream with the second main mixer of each of the plurality of second mixing assemblies such that the second main mixer fuel-air mixture with the second main mixer of each of the plurality of second mixing assemblies is more fuel-lean than the first main mixer fuel-air mixture with the first main mixer of each of the plurality of first mixing assemblies.

17. The method of claim 16, wherein, for the plurality of first mixing assemblies, the pilot fuel stream includes 90% to 100% of a total amount of fuel injected into the combustion chamber during idle conditions of the turbine engine, 35% to 50% of the total amount of fuel during approach conditions of the turbine engine, 20% to 40% of the total amount of fuel during cruise conditions of the turbine engine, and 5% to 20% of the total amount of fuel during climb conditions or take-off conditions of the turbine engine.

18. The method of claim 17, wherein, for the plurality of first mixing assemblies, the first main fuel stream includes 0% to 5% of the total amount of fuel during idle conditions of the turbine engine, 50% to 58% of the total amount of fuel during approach conditions of the turbine engine, 55% to 70% of the total amount of fuel during cruise conditions of the turbine engine, and 65% to 72% of the total amount of fuel during climb conditions or take-off conditions of the turbine engine.

19. The method of claim 18, wherein, for the plurality of second mixing assemblies, the second main fuel stream includes 0% to 5% of the total amount of fuel during idle conditions of the turbine engine, 0% to 7% of the total amount of fuel during approach conditions of the turbine engine, 5% to 10% of the total amount of fuel during cruise conditions of the turbine engine, and 15% to 23% of the total amount of fuel during climb conditions or take-off conditions of the turbine engine.

20. The method of claim 12, further comprising:

combusting the pilot fuel-air mixture and the first main mixer fuel-air mixture from the plurality of first mixing assemblies in a first combustion process to generate combustion gases in the first combustion zone;

combusting the second main mixer fuel-air mixture from the plurality of second mixing assemblies in a second combustion process to generate combustion gases in the second combustion zone; and mixing the combustion gases generated in the second combustion process with the combustion gases generated in the first combustion process downstream of the first combustion zone.

* * * * *